US006692830B2

(12) United States Patent
Argoitia et al.

(10) Patent No.: US 6,692,830 B2
(45) Date of Patent: Feb. 17, 2004

(54) DIFFRACTIVE PIGMENT FLAKES AND COMPOSITIONS

(75) Inventors: Alberto Argoitia, Santa Rosa, CA (US); Richard A. Bradley, Jr., Santa Rosa, CA (US)

(73) Assignee: Flex Products, Inc., Santa Rosa, CA (US)

( * ) Notice: Subject to any disclaimer, the term of this patent is extended or adjusted under 35 U.S.C. 154(b) by 0 days.

(21) Appl. No.: 09/919,346

(22) Filed: Jul. 31, 2001

(65) Prior Publication Data

US 2003/0031870 A1 Feb. 13, 2003

(51) Int. Cl.[7] ............................................. B32B 5/16
(52) U.S. Cl. ..................... 428/403; 359/575; 359/576
(58) Field of Search .................. 359/575, 576; 428/403

(56) References Cited

U.S. PATENT DOCUMENTS

| | | | |
|---|---|---|---|
| 3,011,383 A | 12/1961 | Sylvester et al. ............... 88/1 |
| 4,066,280 A | 1/1978 | LaCapria ........................ 283/8 |
| 4,126,373 A | * 11/1978 | Moraw ...................... 350/3.61 |
| 4,155,627 A | 5/1979 | Gale et al. ................... 350/162 |
| 4,168,983 A | 9/1979 | Vittands et al. .......... 106/14.12 |
| 4,434,010 A | 2/1984 | Ash ............................ 106/291 |
| 4,705,300 A | 11/1987 | Berning et al. ............... 283/91 |
| 4,705,356 A | 11/1987 | Berning et al. ............. 350/166 |
| 4,721,217 A | 1/1988 | Phillips et al. .............. 215/230 |
| 4,756,771 A | 7/1988 | Brodalla et al. ............. 148/6.1 |
| 4,779,898 A | 10/1988 | Berning et al. ............... 283/58 |
| 4,838,648 A | 6/1989 | Phillips et al. .............. 350/166 |
| 4,879,140 A | * 11/1989 | Gray et al. |
| 4,930,866 A | 6/1990 | Berning et al. ............. 350/320 |
| 5,002,312 A | 3/1991 | Phillips et al. ................ 283/72 |
| 5,009,486 A | 4/1991 | Dobrowolski et al. ....... 350/164 |
| 5,059,245 A | 10/1991 | Phillips et al. ................ 106/22 |

(List continued on next page.)

FOREIGN PATENT DOCUMENTS

| | | |
|---|---|---|
| DE | 43 43 387 | 6/1995 |
| EP | 0 756 945 | 2/1997 |
| WO | WO 98/12583 | 3/1998 |
| WO | WO 00/08596 | 2/2000 |

OTHER PUBLICATIONS

J.A. Dobrowolski, K.M. Baird; P.D. Carman; and, A. Waldorf, "*Optical Interference Coatings for Inhibiting of Counterfeiting,*" Optica Acta, 1973, vol. 20, No. 12, 925–937.

Frans Defilet, LGZ Landis & Gyr Zug Corporation, "Kinegrams 'Optical Variable Devices' (OVD's) For Banknotes, Security Documents and Plastic Cards," San Diego, Apr. 1–3, 1987.

S.P. McGrew, "*Hologram Counterfeiting: Problems and Solutions,*" SPIE, vol. 1210 Optical Security and Anticounterfeiting Systems, 1990, pp. 66–76.

(List continued on next page.)

*Primary Examiner*—H. Thi Le
(74) *Attorney, Agent, or Firm*—Holme Roberts & Owen LLP

(57) ABSTRACT

Diffractive pigment flakes include single layer or multiple layer flakes that have a diffractive structure formed on a surface thereof. The multiple layer flakes can have a symmetrical stacked coating structure on opposing sides of a reflective core layer, or can be formed with encapsulating coatings around the reflective core layer. The diffractive pigment flakes can be interspersed into liquid media such as paints or inks to produce diffractive compositions for subsequent application to a variety of objects. The diffractive pigment flakes can be formed with a variety of diffractive structures thereon to produce selected optical effects.

37 Claims, 23 Drawing Sheets

U.S. PATENT DOCUMENTS

| | | | | |
|---|---|---|---|---|
| 5,084,351 | A | 1/1992 | Philips et al. | 428/411.1 |
| 5,106,125 | A | 4/1992 | Antes | 283/91 |
| 5,135,812 | A | 8/1992 | Phillips et al. | 428/403 |
| 5,171,363 | A | 12/1992 | Phillips et al. | |
| 5,214,580 | A | 5/1993 | Aparo | 364/413.01 |
| 5,254,390 | A | 10/1993 | Lu | 428/156 |
| 5,278,590 | A | 1/1994 | Phillips et al. | 359/589 |
| 5,279,657 | A | 1/1994 | Phillips et al. | 106/22 |
| 5,339,737 | A | 8/1994 | Lewis et al. | 101/454 |
| 5,364,467 | A | 11/1994 | Schmid et al. | 106/404 |
| 5,464,710 | A | 11/1995 | Yang | 430/1 |
| 5,549,774 | A | 8/1996 | Miekka et al. | 156/209 |
| 5,549,953 | A | 8/1996 | Li | 428/64.1 |
| 5,571,624 | A | 11/1996 | Phillips et al. | 428/403 |
| 5,591,527 | A | 1/1997 | Lu | |
| 5,624,076 | A | 4/1997 | Miekka et al. | 241/3 |
| RE35,512 | E | 5/1997 | Nowak et al. | 101/454 |
| 5,629,068 | A | 5/1997 | Miekka et al. | 428/148 |
| 5,648,165 | A | 7/1997 | Phillips et al. | 428/346 |
| 5,650,248 | A | 7/1997 | Miekka et al. | 430/1 |
| 5,672,410 | A * | 9/1997 | Miekka et al. | |
| 5,700,550 | A | 12/1997 | Uyama et al. | 428/212 |
| 5,763,086 | A | 6/1998 | Schmid et al. | 428/404 |
| 5,856,048 | A | 1/1999 | Tahara et al. | 430/1 |
| 5,858,078 | A | 1/1999 | Andes et al. | 106/437 |
| 5,912,767 | A | 6/1999 | Lee | 359/567 |
| 5,989,626 | A | 11/1999 | Coombs et al. | 427/162 |
| 6,013,370 | A | 1/2000 | Coulter et al. | 428/403 |
| 6,031,457 | A | 2/2000 | Bonkowski et al. | 340/572.1 |
| 6,043,936 | A * | 3/2000 | Large | |
| 6,045,230 | A * | 4/2000 | Dreyer et al. | 359/529 |
| 6,068,691 | A | 5/2000 | Miekka et al. | 106/403 |
| 6,112,388 | A | 9/2000 | Kimoto et al. | 29/173 |
| 6,150,022 | A | 11/2000 | Coulter et al. | 428/403 |
| 6,157,489 | A | 12/2000 | Bradley, Jr. et al. | 359/584 |
| 6,168,100 | B1 | 1/2001 | Kato et al. | 241/1 |
| 6,241,858 | B1 | 6/2001 | Phillips et al. | 204/192.15 |
| 6,242,510 | B1 | 6/2001 | Killey | 523/204 |

OTHER PUBLICATIONS

Rudolf L. van Renesse, "*Security Design of Valuable Documents,*" SPIE, vol. 2659, Jun. 1996, pp. 10–20.

Steve McGrew, "*Countermeasures Against Hologram Counterfeiting,*" Internet site www.iea.com/nli/publications/countermeasures.htm, Jan. 6, 2000.

Roger W. Phillips, "*Optically Variable Films, Pigments and Inks,*" SPIE vol. 1323, Optical Thin Films III: New Developments, 1990, pp. 98–109.

Roger W. Phillips and Anton F. Bleikolm, "*Optical Coatings for Document Security,*" Applied Optics, vol. 35, No. 28, Oct. 1, 1996, pp. 5529–5534.

J.A. Dobrowolski, F.C. Ho; and, A. Waldorf, "*Research on Thin Film Anticounterfeiting Coatings at the National Research Council of Canada,*" Applied Optics, vol. 28, No. 15, Jul. 15, 1989, pp. 2702–2717.

J. Rolfe, "*Optically Variable Devices for Use on Bank Notes,*" SPIE, vol. 1210 Optical Security and Anticounterfeiting Systems, pp. 14–19, 1990.

OVD Kinegram Cor, "*OVD Kinegram Management of Light to Provide Security,*" Internet site www.kiknegram.com/xhome/home.html, Dec. 17, 1999.

I.M. Boswarva, et al., "*Roll Coater System for the Production of Optically Variable Devices (OVD's) for Security Applications,*" Proceedings, 33rd Annual Technical Conference, Society of Vacuum Coaters, pp. 103–109 (1990).

Don W. Tomkins, Kurz Hastings, "*Transparent Overlays for Security Printing and Plastic ID Cards,*" Caribe Royale, Orlando, Florida, Nov. 19–21, 1997, pp. 1–8.

Zink, et al, "*Optical Probes and Properties of Aluminosilicate Glasses Prepared by the Sol–Gel Method,*" Polym. Mater. Sci. Eng., 61, pp. 204–208 (1989).

McKieman, et al, "*Luminescence and Laser Action of Coumarin Dyes Doped in Silcate and Aluminosilicate Glasses Prepared by the Sol–Gel Technique,*" J. Inorg. Organomet. Polym, 1(1), pp. 87–103 (1991).

\* cited by examiner

DIFFRACTIVE PIGMENT FLAKES AND COMPOSITIONS

BACKGROUND OF THE INVENTION

1. Field of the Invention

The present invention relates generally to optical effect pigments. In particular, the present invention is related to diffractive pigment flakes and compositions containing same which can have a variety of diffractive structures on the flakes to produce selected optical effects.

2. Background Technology

Various pigments, colorants, and foils have been developed for a wide variety of applications. For example, diffractive pigments have been developed for use in applications such as creating patterned surfaces, and security devices. Diffractive patterns and embossments have wide-ranging practical applications due to their aesthetic and utilitarian visual effects.

One very desirable decorative effect is the iridescent visual effect created by a diffraction grating. This striking visual effect occurs when light is diffracted into its color components by reflection from the diffraction grating. In general, diffractive gratings are essentially repetitive structures made of lines or grooves in a material to form a peak and trough structure. Desired optical effects within the visible spectrum occur when diffraction gratings have regularly spaced grooves at specified depths on a reflective surface.

The color shifting properties of diffraction gratings and like structures are well known, particularly when used to form holographic images on continuous foils. One feature of diffractive surfaces as described above is that they perform better with directional illumination in order to be visualized. The continuous and rapid variation in color with viewing angle or illumination angle under a predominant and well collimated light source is due to the angular dispersion of light according to wavelength in each of the orders of the diffracted beams. In contrast, diffuse light sources, such as ordinary room lights or light from an overcast sky, when used to illuminate the diffractive colorant or image, do not reveal much of the visual information contained in the diffractive colorant or image, and what is typically seen is only the colored or non-colored background reflection from the embossed surface.

There have been attempts to exploit the optical effects created by such devices by dispersing small fragments of diffractive particles in a transparent vehicle onto irregular printed surfaces. These efforts include a wide variety of diffractive structures that provide dispersion of visible light such that the viewer perceives a different color depending on the orientation with respect to the diffractive surface or the illumination geometry. However, each structure heretofore created has its limitations, such as a glittery appearance that is aesthetically undesirable for many purposes.

For example, Spectratek Technologies Inc. of Los Angeles, Calif. produces a relatively large diffractive flake that produces particles that create varying colors depending on orientation of illumination or view. However, the large size of the flakes also contributes to a distinct sparkle, or "glittery" appearance. The flakes are described in U.S. Pat. No. 6,242,510, stating that: "[t]he unique ability of the prismatic platelets 18 to reflect light at many angles presents a constantly changing image as the line of site for the viewer is changed. The overall effect is best described as a myriad of small, bright reflections, similar to the radiant sparkle of crystals, crushed glass or even the twinkle of starlight." (Column 5, lines 56–62).

These particles are described in Spectratek's literature as having a minimum size of 50 by 50 microns. It is because of this relatively large size that they tend to be visible as individual particles. Additionally, because the flake thickness is about 12 microns, even a relatively large 100 micron particle has an aspect ratio of about 8:1, thus precluding cooperative orientation with respect to each other and to a substrate. Despite the well recognized need for particulates smaller than 50 microns in many painting and printing methods, neither a reduction in particle size or increase in aspect ratio, i.e. greater than about 8:1, is commercially available, presumably due to the ductility of the thick plastic film layers in the construction. Analysis of these commercial flakes reveals they comprise a metallic foil protected by thick layers of plastic film. The metal layer forms the diffractive structure, which contains linear undulations at a spacing corresponding to about 1,700 to 1,800 lines per mm (ln/mm) with an undulation depth of about 140 nm.

In certain applications the continuous changes in color that can be achieved in a continuous foil form of diffraction grating are more preferred than has been heretofore achieved by flake based pigments. Conventional structures and methods of producing particles with diffractive gratings thereon have rendered such particles unsuitable for achieving the optical features achievable by foil structures. Heretofore, modifications of one structural parameter, while potentially beneficial to optical performance, inevitably have had an adverse impact on another critical characteristic. When the particles are large, disorientation results in a glittery effect. When the particles are small and not well oriented, the multiple colors are no longer distinct but tend to blend in appearance. Thus, even under highly collimated illumination the viewer perceives a washed out color range, rather than bright distinct colors characteristic of a continuous foil.

One attempt to provide more uniform colors, such as is required in color shifting security ink, is described in U.S. Pat. No. 5,912,767 to Lee (hereinafter "Lee"). Lee discloses that particles having a circular arrangement of the diffractive features, with grooves having a frequency of between 1,600 to 2,000 ln/mm (a groove width of 0.4 to 0.6 microns), are necessary to obtain a uniform appearance. In one preferred embodiment Lee discloses that one method of improving the uniformity of the color appearance is modulating the groove spacing with respect to the distance from the center of each particle. However, the circular grating structure is likely to suffer from very low brightness, due to the limited number of effective lines, which represent just a sub-region of very small 20 micron particles, as compared to particles of the same size having a simple linear grating type structure. Further, Lee has no teaching as to particle thickness or groove depth and no quantification of the performance that might provide a motivation to develop an efficient or economic method to produce such complex particles.

U.S. Pat. No. 6,112,388 to Kimoto et al. (hereinafter "Kimoto") teaches the use of inorganic dielectric layers to protect and stiffen a metallic foil. Kimoto requires a rather thick dielectric layer of 1 micron such that the final particle thickness is between about 2.5 and 3 microns. Since the desirable particle size is 25 to 45 microns, this results in an aspect ratio of between about 10:1 to 22:1. At the lower end of such an aspect ratio there is a greater preponderance for disorientation of the particles with respect to the surface of the coated or painted article, which coupled with the relatively large thickness results in a rougher outer surface. The rougher surface detracts from the appearance and is particularly problematic in many applications, such as automotive paint. Although a thicker top gloss coating may partially mask the roughness, it increases the cost and manufacturing cycle time. Increasing the particle size to improve the aspect ratio would make such particles too large for paint spray applications as well as increase the observable glitter effect. While such particles might be amenable to other painting or printing methods, the particles are highly fragile and friable because the thickness of the metal layer is insufficient to increase the fracture toughness of the inorganic material. Thus, the benefits of a higher aspect ratio may not be achievable in the resultant product.

Embossing metal flakes is one conventional approach to producing diffractive particles. However, the necessity of plastically deforming such flakes in order to obtain a permanent modulation height results in particles that do not have the necessary optical characteristics to produce bright distinct colors. For example, U.S. Pat. No. 6,168,100 to Kato et al. (hereinafter "Kato") discloses methods of embossing metal flakes with a diffractive relief pattern. FIG. 7 of Kato depicts an actual micrograph of flakes having a groove frequency measured to have about 1,300 ln/mm with a depth of about 800 nm. The flake appears corrugated in that actual thickness of the metal layer, which is suggested to be within the range of 0.4 to 1 micron, is less than the groove depth. Since the optical performance requires a stable surface microstructure, the embossing process must plastically deform the metal foil, resulting in a significant groove depth in relationship to the foil thickness. While the resulting corrugated structure might be expected to remain flat transverse to the groove direction due to the stiffening effect of the grooves, the flake also appears to have a distinct curvature in the direction of the grooves.

Similarly, U.S. Pat. Nos. 5,549,774 and 5,629,068 to Miekka et al. disclose methods of enhancing the optical effects of colorants by the application of inks, such as metallic flake inks, metallic effect inks, or inks with pigments formed of optical stacks, upon embossed metallic leafing. These patents suggest that such embossed metallic leafing pigments should have a particle size between 10 to 50 microns for compatibility with painting or printing techniques. The frequency of the diffractive features in the case of linear grooves having a sinusoidal shape are disclosed as greater than about 600 ln/mm with a depth that should be less than about 500 nm.

U.S. Pat. Nos. 5,672,410, 5,624,076, 6,068,691, and 5,650,248 to Miekka et al. disclose a process for forming embossed thin bright metal particles with a metallic thickness of 10 to 50 nm. This is accomplished by metalizing an embossed release surface with aluminum. These patents suggest that the frequency of the diffractive features should be between 500 to 1,100 ln/mm and that the same process could be used to make multi-layer thin film optical stacks having the structure corresponding to an embossed carrier film or substrate. Embossment techniques are limited, however, with thin flakes because they can lead to undesirable flake deformation (curvature or departure from flatness) and/or fracture, thereby diminishing the angular resolution of the particulates as well as the overall brightness.

In summary, the conventional technology teaches various ways of making particulates having a diffraction grating type structure that collectively create some color dispersion when reconstituted and applied to the surface of an object. While the conventional diffractive microstructures produce a characteristic angular dispersion of visible light according to wavelength, other aspects of the particle microstructure and micromechanics favor an assembly of such particles having a less desirable glittery or sparkle appearance. This is shown in the final appearance of articles printed or painted with conventional particulates. Such printed or painted articles have an appearance which is apparently limited by the size, thickness and fragility of the particulates. The conventional diffractive microstructured particulates are all thus ineffective in providing an aesthetically pleasing paint, printed ink, or laminate that provides distinct color bands within a continuous rainbow on a curved surface.

SUMMARY OF THE INVENTION

The present invention relates to diffractive pigment flakes and compositions which incorporate the diffractive pigment flakes. The diffractive pigment flakes include single layer or multiple layer flakes that have a diffractive structure formed on a surface thereof. The multiple layer flakes can have a symmetrical stacked coating structure on opposing sides of a reflective core layer, or can be formed with encapsulating coatings around the reflective core layer. The diffractive pigment flakes can be interspersed into liquid media such as paints or inks to produce diffractive compositions for subsequent application to a variety of objects.

The diffractive pigment flakes can be formed with a variety of diffractive structures thereon to produce selected optical effects. In particular, the diffractive pigment flakes are fabricated to have specific diffractive surface microstructures along with physical and micro-mechanical attributes that provide enhanced optical effects.

The diffractive structure on the flakes can be an optical interference pattern such as a diffractive grating or holographic image pattern. Depending on the desired optical effects, suitable grated microstructures are selected for the production of flakes with the optimal diffractive effects. Such optical effects are created by the right combination of diffractive and reflective optics to produce, for example, strong, eye-catching optical effects that change and flash as the viewer changes position. Advantageously, some embodiments of the invention have a high frequency diffractive grating, providing greater options for color selection and control as well as providing higher chroma pigments. The depth, frequency, arrangement, and form of the gratings can be selected according to the teachings herein to achieve desired colors and effects.

In one embodiment of the invention, a diffractive pigment flake comprises a central reflector layer having first and second dielectric layers overlying opposing surfaces of the reflector layer. Alternatively, the dielectric layers may only contact the opposing surfaces of the central reflector layer, or the dielectric layers can connect to form part of a contiguous outer layer substantially surrounding the central reflector layer. The dielectric layers provide rigidity and durability to the diffractive pigment flakes.

According to another aspect of the invention, diffractive compositions are provided which include a pigment medium, and a plurality of pigment flakes dispersed in the pigment medium. The pigment flakes can include any of the variety of diffractive flakes disclosed herein, or can include a mixture of diffractive and non-diffractive flakes. The diffractive compositions can be applied to a variety of objects to add unique decorative features as well as both visually perceptible and non-visually perceptible security features.

These and other features of the present invention will become more fully apparent from the following description and appended claims, or may be learned by the practice of the invention.

BRIEF DESCRIPTION OF THE DRAWINGS

In order to illustrate the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
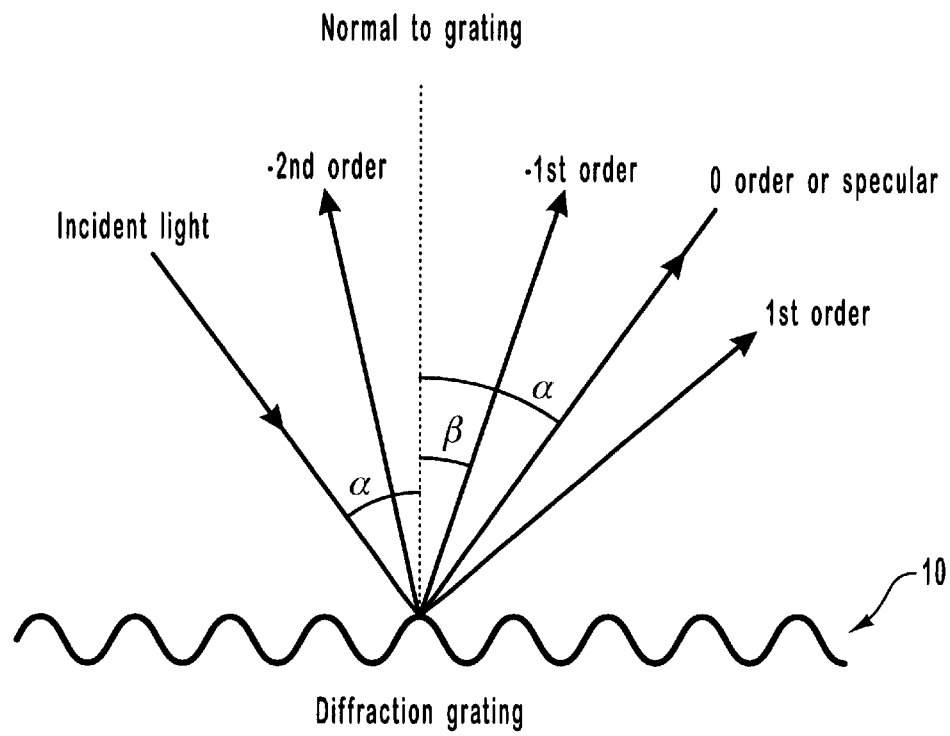
FIG. 1 is an illustration depicting the separation of polychromatic light into its component wavelengths by a diffraction grating.

The present invention is directed to diffractive pigment flakes and diffractive compositions containing the diffractive pigment flakes. The diffractive pigment flakes and compositions can be used to add unique decorative features to products, as well as both visually perceptible and non-visually perceptible security features to a variety of objects. The diffractive flakes can comprise any of a variety of single or multilayer structures to create a wide range of optical effects.

Depending on the desired optical colors and effects, suitable grated microstructures are selected for the production of the diffractive flakes with the optimal diffractive effects. For example, the pigment flakes can include a higher frequency diffractive grating microstructure such as a diffraction grating pattern having greater than about 1100 grating lines per mm (ln/mm) to create a wide range of optical effects.

In some embodiments of the invention, the diffractive flakes provide strong eye-catching optical effects, the optical effects created by the right combination of diffractive and reflective optics that change and flash as the viewer changes position. Such eye-catching optical effects include iridescent effects, and can be used to create both decorative features as well as visually perceptible security features.

In other embodiments of the invention, covert security features can be provided in the pigment flakes. In such embodiments, the diffractive effects are only perceptible outside the visible wavelength range, such as in the ultra-violet (UV) or infrared (IR) wavelength ranges. This covert feature is produced by using gratings which only preferentially create diffractive effects in the UV or IR wavelength range. For example, at normal incidence, flakes with a grating frequency above about 2500 ln/mm produce diffractive effects that are only perceptible in the wavelength range of about 100 nm to about 400 nm. Thus, a conventional UV detection apparatus can be configured to quickly and accurately detect the presence of such diffractive flakes, while the unaided human eye is unable to detect the presence of the diffractive structures.

In various embodiments of the invention, the diffractive optical effects are visually perceived as an iridescent optical effect over a background color. As used herein the term "background color" denotes the strongest color present when a diffractive surface is viewed in diffuse light. The background color can be obtained by any combination of organic or inorganic layers with selective or non-selective, single or combined optical properties such as absorption, emission, reflection, scattering, fluorescence, and the like.

In some embodiments of the invention, the diffractive pigment flakes are "achromatic" diffractive pigments. The term "achromatic" refers to the lack of background color or chroma produced by the pigment flakes. Instead, the background of the pigment flakes can range from dark (e.g., gray) to bright (e.g., silver) in their lightness characteristic without having any chroma characteristics. Diffractive optical effects are visually perceived as an iridescent optical effect over the gray or silver background when achromatic pigments are applied to an object.

The diffractive pigment flakes of the present invention are fabricated to have specific diffractive surface microstructures along with physical and micro-mechanical attributes that provide enhanced optical effects and which overcome the deficiencies in prior conventional diffractive pigments. In conventional diffractive particulate pigments, the reflected color is so highly sensitive to the viewing and illumination conditions that the diffractive particulate must possess previously mutually exclusive characteristics of: 1) a small particle size, stiffness and high aspect ratio to favor cooperative orientation of all the particulates substantially parallel to a coated article's surface, or other preferred orientation; 2) limitations in the angular range and/or intensity of characteristic color; and 3) enhancement of the brightness of the reflected color to overcome the inherent decrease arising from the small particle size. When other characteristics are optimized, simple linear grating structures on the flakes of the invention provide a greater brightness than more complicated variations in grating structure that have been suggested in the prior art, such as concentric or spatially modulated gratings.

Accordingly, the inventive diffractive particulate preferably comprise rigid platelet or flake-like particles having at least one highly reflective layer containing a diffractive structure, such as a spatial modulation in height (with respect to a reference plane defined by the major axis of the platelet or flake). The flakes are substantially rigid due to either the mechanical properties of the reflective layer, a rigid transparent overcoating or a rigid central layer.

The flakes of the invention can be formed to have a physical thickness of about 500 nm to about 2 microns (2,000 nm), preferably about 800 nm to about 1400 nm (1.4 microns). Although the flakes of the present invention are not of a uniform shape, the flakes can have an average particle size or "width" across the major surfaces thereof of about 50 microns or less, and preferably about 25 microns or less. The aspect ratio of flake width to flake thickness for the flakes of the invention is at least about 10:1, and preferably at least about 25:1.

The line frequency of the diffractive structure on the flakes is preferably greater than about 1,200 ln/mm, such that light corresponding to the range of visible wavelengths in the first or higher order diffracted beams is substantially angularly separated from the same range of wavelengths in higher order diffracted beams when illuminated at normal incidence up to at least about 60 degrees from normal incidence. Additionally, the diffractive structure amplitude, which in a grating is the depth of the grooves, is such that the zero order diffracted beam is substantially suppressed in intensity so that the intensity of the higher order beams are enhanced over the desired range of wavelengths and/or angles of incidence. Accordingly, in one embodiment of the invention, the diffractive structure is a linear blazed (i.e., sawtooth shape) grating having a frequency of at least about 1,400 ln/mm and a groove depth greater than about 160 nm. In another embodiment of the invention, the diffractive structure is a linear sinusoidal grating having a frequency of at least about 2,000 ln/mm and a groove depth greater than about 160 nm.

Under such conditions, the high reflectivity and stiffness at the optimum aspect ratio and particle size is preferably obtained by depositing multiple thin film layers on a substrate with a structured surface having a releasable intermediate coating layer such that appropriately sized flakes defoliate from the substrate surface replicating its shape. The flakes of the invention can be formed using conventional thin film deposition techniques, which are well known in the art of forming thin coating structures. Nonlimiting examples of such thin film deposition techniques include physical vapor deposition (PVD), chemical vapor deposition (CVD), plasma enhanced (PE) variations thereof such as PECVD or downstream PECVD, sputtering, electrolysis deposition, and other like deposition methods that lead to the formation of discrete and uniform thin film layers. The physical and chemical vapor deposition methods provide for adequate replication of a smooth, relief varying substrate without the introduction of undesirable surface roughness.

In one preferred embodiment of the diffractive flakes, a transparent dielectric material, such as magnesium fluoride ($MgF_2$), can be deposited as a first layer and third layer to form stiffening protective layers over a second (inner) opaque aluminum layer. The $MgF_2$ layers are preferably each about 250 nm to about 450 nm thick, and the aluminum layer is preferably about 80 nm to about 160 nm thick. The diffractive flakes have a total thickness of less than about 1,400 nm, and preferably from about 500 nm to about 900 nm.

Although the majority of the discussion herein is directed to diffractive gratings, it will be understood by those skilled in the art that holographic image patterns can be substituted for the gratings in many of the embodiments.

Diffractive Grating Design Technique

In one aspect of the invention, a design technique is provided which utilizes diffraction grating theory to select suitable microstructures for the fabrication of flakes or foils with desired diffractive properties. In this technique, various grating shapes can be modeled with conventional optical software to suppress and/or control the specular reflection and the intensity of the diffractive orders to obtain an optimum grating design. Various grating shapes can be selected for modeling, such as triangular symmetrical, triangular blazed, square-wave with different top plateau sizes, and sinusoidal gratings with different groove frequencies and depth profiles. The modeling results can then be used to select grating substrates for the deposition of coating layers to form pigments and foils as described hereafter. Specific modeling results are set forth in the Examples section hereafter.

Diffraction grating theory indicates that the efficiency of the zero and successive orders can be optimized, thereby allowing for the production of grated flakes having desired optical properties. These flakes have diffractive optical properties that can be tailored depending on the final desired optical effect. Because the color of traditional pigments fades strongly at high view angles, diffractive effects can be introduced in addition to the combined refractive, reflective, absorbing, and the like optical properties of traditional pigments. As a result, diffractive pigments will create strong beams of diffracted light, even at high viewing angles.

Figure 2:
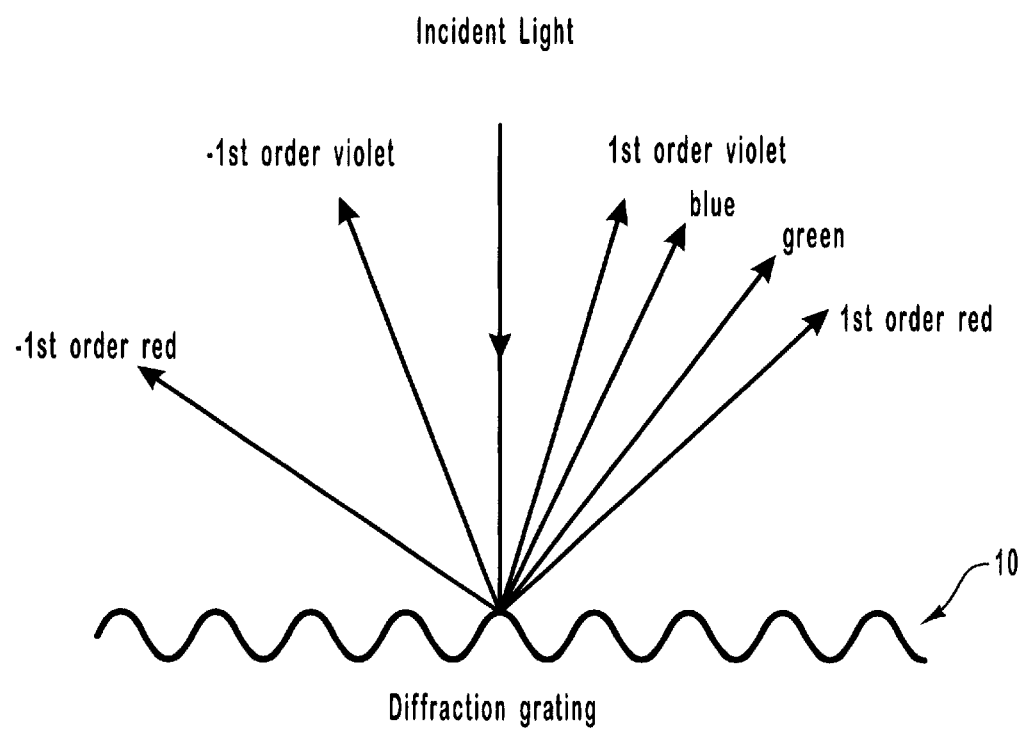
FIG. 2 is another illustration depicting the separation of polychromatic light into its component wavelengths by a diffraction grating.

FIGS. 1 and 2 are schematic depictions of the operation of a conventional diffraction grating 10 showing the separation (diffraction) of polychromatic light (white light) into its component wavelengths (rainbow). As illustrated in FIG. 1, light incident on a grating surface at an angle that is not normal to the surface creates a zero order or specular reflection that is a mirror effect color. The diffractive grating 10 creates a first order diffraction ($-1^{st}$ order and $1^{st}$ order) surrounding the zero order reflection. Similarly, a second order diffraction is created at higher angles than the first order diffraction.

FIG. 2 further illustrates the color effects that result from light incident on a diffractive surface. In this case the incident light is normal to the grating. First order colors corresponding to a rainbow of colors are produced at different angles surrounding the specular reflection.

For a unique set of discrete angles and for a given spacing "d" between grating peaks, the diffracted light from each facet of the grating is in phase with the light diffracted from any other facet, so they combine constructively, as described by Equation 1:

$$Gm\lambda = \sin \alpha + \sin \beta \quad \text{(equation 1)}$$

where $G=1/d$ is the groove density or pitch, $\alpha$ is the angle between the incident light and the normal to the grating, $\beta$ is the angle between the diffracted beam and the normal to the grating, and m is an integer called the diffraction order. For m=0, $\beta=-\alpha$ for all wavelengths ($\lambda$), and the grating acts as a mirror, with the wavelengths not being separated from each other. This is called specular reflection or zero order.

The angular dispersion is a measure of the angular spread $\partial \beta$ of a spectrum of order m between the wavelengths $\lambda$ and $\lambda+\partial\lambda$. It is defined as $\partial\beta/\partial\lambda = m/d \cos \beta$ and indicates that the closer the space between grooves (higher frequency), the stronger the angular dispersion. In other words, the angular separation between wavelengths increases for a given order m with higher groove frequencies.

For a given grating frequency, each successive order is wider (stronger angular dispersion), however, overlapping of the spectra will occur for lower frequency gratings. This also leads to target angular dispersion between orders. The closer the space between grooves, the farther apart will be the diffractive orders. In other words, the space between grooves of a grating determines the order separation.

A grating on a larger sized particle will improve the definition of the various orders, resulting in a better resolving power, since multiple grating lines are present on the particle. The resolving power R is a measure of the ability of a grating to separate adjacent spectral lines. For a planar diffraction grating, the resolving power is given by R =mN, where m is the diffraction order and N is the total number of grooves illuminated on the surface of the grating. Replacing m from Equation 1 a more meaningful expression can be obtained:

$$R = Nd(\sin \alpha + \sin \beta)/\lambda \quad \text{(equation 2)}$$

where the quantity Nd is simply the grating width (W). As expressed by Equation 2, R is not dependent explicitly on the order or the number of grooves; these parameters are contained within the grating width and the angles of incidence and diffraction. The maximum attainable resolving power is then $R_{max}=2W/\lambda$. The degree to which the theoretical resolving power is attained depends also on the optical quality of the grating surface. In general, it is considered that any departure greater than $\lambda/10$ from flatness for a plane grating will result in a loss of resolving power.

P-polarization or TE polarized light is defined when the light is polarized parallel to the grating grooves, while S-Polarization or TM polarized light is polarized perpendicular to the grating grooves.

Equation 1 is applicable in the case that the incident and diffracted rays are perpendicular to the grooves (as normally positioned in spectroscopic instrumentation and termed in-plane diffraction). If the incident light is not perpendicular to the grooves, equation 1 has to be modified as:

$$Gm\lambda = \cos \epsilon (\sin \alpha + \sin \beta) \quad \text{(equation 3)}$$

where $\epsilon$ is the angle between the incident light path and the plane perpendicular to the grooves at the grating center. For geometries where $\epsilon$ is different than zero (azimuthal rotation of the grating), the diffracted spectra lie on a cone rather than in a plane, so such cases are termed conical diffraction.

Further, for a given grating frequency, the depth of the grooves determines the relative intensity of the various orders.

The previous points related to diffraction grating theory can be used in modeling and designing appropriate diffraction grating structures for fabricating the flakes and foils of the invention. For example, the definition of the resolving power indicates that in the case of diffractive flakes, smaller flake particles will require a higher groove frequency. In addition, suppression and/or control of zero order effects and maximizing and/or minimizing the intensity to the first orders may accomplish enhancement of diffractive effects, while overlapping of the spectrum of successive orders may cause loss of diffractive effects.

Further, if a grating is azimuthally rotated about an axis perpendicular to the plane of the substrate, cones of the diffracted orders surrounding the specular reflection (zero order) will appear. In most flake-based pigment applications, the paint or ink medium includes an ensemble of small azimuthal pigment flakes that are randomly oriented. In the case of flakes with diffractive grating microstructures, the flake size and the random orientation are strong factors in the optical performance of the ensemble. Accordingly, diffractive pigment flakes in a random azimuthal orientation within a pigment medium such as a paint or ink create rings of diffracted light that are non-existent in non-diffractive flakes.

In addition, gratings work as well in reflection as in transmission in the case that the incident beam is perpendicular to the plane of the grating (P-polarization). Thus, complex light paths will occur in an optically variable or color shifting stack when diffractive structures are superimposed onto layers that function as reflectors, dielectrics, and absorbers.

As mentioned before, the amount of energy relative to the incident energy (efficiency) of gratings varies as a function of the type of grating and its groove depth. As a result the grating can be optimized for specific wavelengths through modeling. Thus, suitable diffraction grating structures for use in forming the flakes and foils of the invention can be selected which have specified line frequencies and groove depths so that the grating is optimized as desired. The grating frequency and depth is determined for a particular grating based upon the equations and considerations outlined hereinabove.

In some embodiments of the invention, a grating structure is utilized having a diffraction grating pattern with a frequency of from about 1000 to about 4000 grating ln/mm, preferably from about 1400 to about 3500 grating ln/mm, and more preferably from about 1400 to about 2000 grating ln/mm. Further, the gratings can have a groove depth of about 20 nm to about 300 nm, and preferably from about 100 nm to about 250 nm.

Various shaped gratings can be selected for the grating structures used in the present invention such as triangular symmetrical gratings, triangular blazed gratings, square-wave gratings, sinusoidal gratings, and the like. Alternatively, the grating can be a cross grating having perpendicular or non-perpendicular intersecting grooves, which create a line spectrum in different planes simultaneously.

Figure 3:
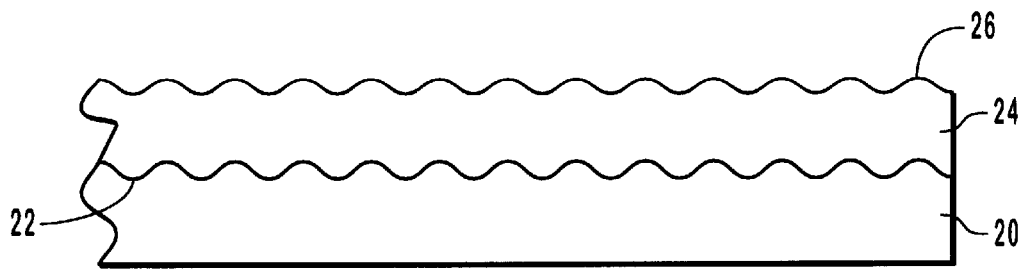
FIG. 3 is a schematic depiction of a web or foil grating which is used to form the diffractive pigment flakes according to one embodiment of the invention.

Referring now to the drawings, wherein like structures are provided with like reference designations, the drawings only show the structures necessary to understand the present invention. FIG. 3 is a schematic depiction of web or foil grating 20 having a diffractive structure 22 on an upper surface thereof which is used to form the diffractive pigment flakes according to one embodiment of the invention. The grating line frequency and depth can be determined for a particular grating utilized based upon the equations and considerations set forth previously. For example, a diffraction grating can be employed so that a formed flake will have a diffractive structure thereon with a pitch and amplitude selected to decrease the intensity of a zero order diffracted light beam in order to increase the intensity and color contrast of at least one higher order diffracted light beam. In one embodiment, the diffractive structure has a pitch of at least about 1,400 ln/mm and an amplitude modulation provided by a change in surface depth of at least about 150 nm. In a further embodiment, the diffractive structure can be about 3,000 ln/mm or less, and the change in surface depth can be about 220 nm or less.

A single or multiple layer coating 24 is formed on the upper surface of grating 20, such as by conventional deposition techniques, so that diffractive structure 22 is replicated in coating layer 24 which forms a thin film structure. As illustrated, coating 24 replicates the topography of grating 20 so that the grating peaks and channels are present on opposing surface 26 of coating 24. The thin film structure of coating layer 24 is subsequently fractured and removed from grating 20, such as by either dissolution in a solvent or by way of a release layer, to form a plurality of diffractive pigment flakes.

The diffractive structure is formed on at least a portion of one or both of the major surfaces of the flakes. The diffractive structure on the flakes is capable of producing an angular separation of first and second order diffracted light beams such that there is no angular superposition of wavelengths from about 400 nm to about 800 nm within the first and second order diffracted light beams. The diffractive structure can also be characterized at normal incidence by a ratio of zero order intensity to first order intensity of at least about 0.25 and an angular separation between zero order and first order diffracted or reflected light beams of at least about 30 degrees. The diffractive structure on the flakes can be a diffraction grating pattern with at least about 1,400 grating ln/mm and a grating depth of at least about 150 nm. Preferably, the diffraction grating pattern can have from about 1400 to about 3500 grating ln/mm, with a grating depth from about 150 nm to about 230 nm, and more preferably, the diffraction grating pattern can have from about 1400 to about 1700 grating ln/mm, and a grating depth from about 160 nm to about 220 nm.

The web or foil gratings utilized can be obtained from various commercial sources, such as from Wavefront Technology. In addition, the web or foil gratings can be produced from a thermoplastic film that has been embossed by heat softening the surface of the film and then passing the film through embossing rollers which impart a diffraction grating or holographic image onto the softened surface. In this way, sheets of effectively unlimited length can be formed with the diffraction grating or holographic image thereon. Alternatively, the diffractive structure on the web or foil can be made by passing a roll of plastic film coated with a UV curable polymer, such as PMMA, through a set of UV transparent rollers whereby the rollers set a diffractive surface into the UV curable polymer and the polymer is cured by a UV light that passes through the UV transparent rollers. Other methods of forming an embossed surface on a substrate are disclosed in U.S. Pat. No. 5,549,774 to Miekka et al., which is incorporated by reference herein.

When coating 24 has a single layer, a reflective material can be used to form coating layer 24. Presently preferred reflective materials include various metals or metal alloys because of their high reflectivity and ease of use, although non-metallic reflective materials can also be used. Nonlimiting examples of suitable metallic materials include aluminum, silver, copper, gold, platinum, tin, titanium, palladium, nickel, cobalt, rhodium, niobium, chromium, and compounds, combinations or alloys thereof. In this embodiment, the background color of the flakes will be provided by the intrinsic color of the reflective material and the flakes will display a diffractive effect on the surfaces thereof.

The flakes formed from a single layer coating can have a physical thickness of from about 500 nm to about 1400 nm, preferably from about 700 nm to about 1200 nm.

When coating 24 is a multiple layer coating, coating 24 includes a reflective layer and one or more layers of a different material that has a substantially higher modulus of elasticity than the reflective material, which increases the stiffness of the diffractive pigment flake. For example, a diffractive layer can be formed on one or both major surfaces of the reflective layer. The diffractive layer can be composed of a substantially transparent dielectric material.

Figure 4:
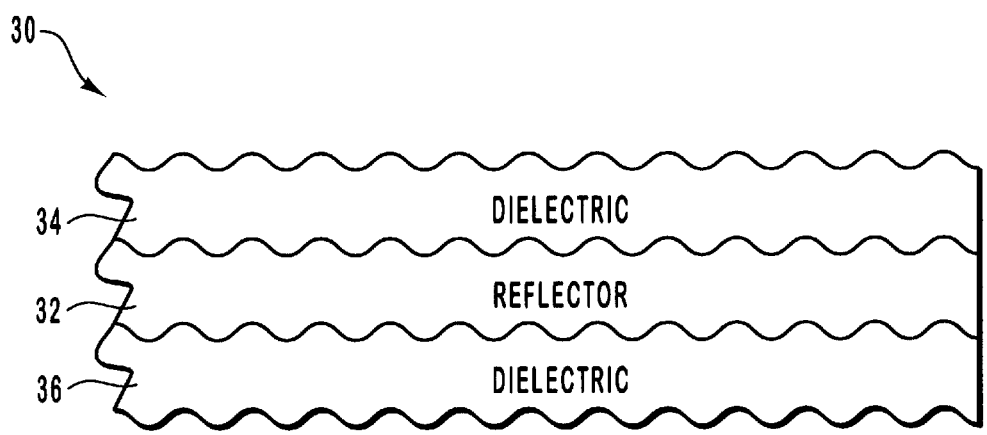
FIG. 4 is a schematic representation of the coating structure of a diffractive pigment flake according to one embodiment of the invention.

FIG. 4 depicts the coating structure of a diffractive flake 30 which has been produced from a multiple layer coating. The flake 30 can have a three layer design with a generally symmetrical thin film structure, including a central reflector layer 32 and opposing dielectric layers 34 and 36 on opposing major surfaces of reflector layer 32 but not on at least one side surface of the reflector layer. Alternatively, flake 30 can be formed with a two layer design, including reflector layer 32 and one of dielectric layers 34 or 36. The dielectric layers provide increased rigidity and durability to flake 30.

The reflector layer 32 can be composed of the same reflective materials as discussed previously for the single layer flakes. The dielectric layers 34 and 36 can be composed of various dielectric materials such as those having a refractive index of about 1.65 or less, and preferably a refractive index of about 1.5 or less. Nonlimiting examples of suitable dielectric materials include magnesium fluoride, silicon dioxide, aluminum oxide, aluminum fluoride, cerium fluoride, lanthanum fluoride, neodymium fluoride, samarium fluoride, barium fluoride, calcium fluoride, lithium fluoride, and combinations thereof.

The reflector layer 32 can have a physical thickness of from about 40 nm to about 200 nm, and preferably from about 80 nm to about 160 nm. The dielectric layers 34 and 36 can each have a physical thickness of about 1 micron or less, preferably from about 200 nm to about 600 nm, and more preferably from about 250 nm to about 450 nm. The total thickness of flake 30 is less than about 1.5 microns, preferably less than about 1,400 nm, and more preferably from about 500 nm to about 900 nm.

In a method for fabricating a plurality of diffractive flakes corresponding to flake 30, the dielectric layers and reflector layer are deposited on the web or foil grating in a sequential manner according to the desired two layer or three layer flake design to form a multiple layer coating having a thin film structure. This thin film structure is subsequently fractured and removed from the grating to form a plurality of diffractive pigment flakes.

Figure 5:
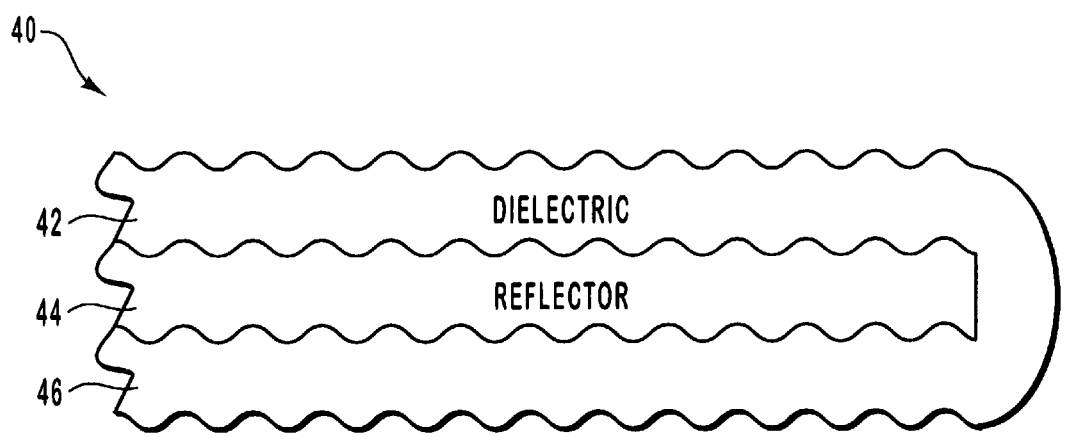
FIG. 5 is a schematic representation of the coating structure of a diffractive pigment flake according to another embodiment of the invention.

FIG. 5 depicts the coating structure of a diffractive flake 40 according to an alternative embodiment of the invention. The flake 40 has a two layer design with a contiguous dielectric layer 42 substantially surrounding and encapsulating a central reflector layer 44. The dielectric layer and reflector layer of flake 40 can be composed of the same materials and can have the same thicknesses as described previously for the corresponding layers in flake 30. The grating frequency and depth of the diffractive structure of flake 40 can be determined and formed as described hereinabove for flake 30.

In a method for fabricating a plurality of diffractive flakes corresponding to flake 40, one or more thin film layers including at least a reflective layer is deposited on a web or foil grating to form a diffractive thin film structure, which is subsequently fractured and removed from the grating to form a plurality of diffractive pigment preflakes corresponding to reflector layer 44. The preflakes can be fragmented further by grinding if desired. The preflakes are then coated with dielectric layer 42 in an encapsulation process to form a plurality of diffractive pigment flakes. When an encapsulation process is used, it will be appreciated that the encapsulating layer is a continuous layer composed of one material and having substantially the same thickness around the flake structure.

Various coating processes can be utilized in forming the dielectric coating layers by encapsulation. For example, suitable preferred methods for forming the dielectric layer include vacuum vapor deposition, sol-gel hydrolysis, CVD in a fluidized bed, downstream plasma onto vibrating trays filled with particles, and electrochemical deposition. A suitable $SiO_2$ sol-gel process is described in U.S. Pat. No. 5,858,078 to Andes et al., the disclosure of which is incorporated by reference herein. Other examples of suitable sol-gel coating techniques useful in the present invention are disclosed in U.S. Pat. No. 4,756,771 to Brodalla; Zink et al., *Optical Probes and Properties of Aluminosilicate Glasses Prepared by the Sol-Gel Method,* Polym. Mater. Sci. Eng., 61, pp. 204–208 (1989); and McKiernan et al., *Luminescence and Laser Action of Coumarin Dyes Doped in Silicate and Aluminosilicate Glasses Prepared by the Sol-Gel Technique,* J. Inorg. Organomet. Polym., 1(1), pp. 87–103 (1991); with the disclosures of each of these incorporated by reference herein.

Figure 6:
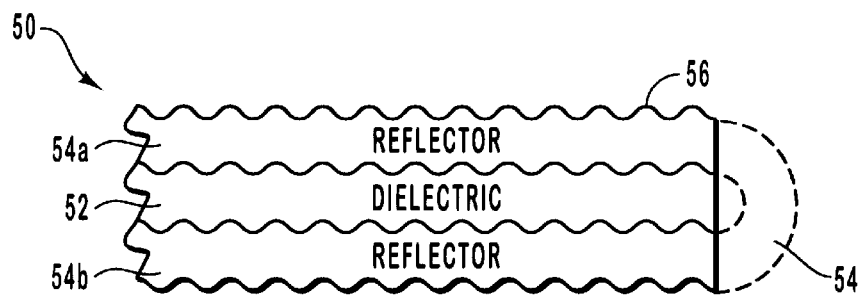
FIG. 6 is a schematic representation of the coating structure of a diffractive pigment flake according to a further embodiment of the invention.

Referring now to FIG. 6, a diffractive pigment flake 50 is depicted according to another embodiment of the invention. The flake 50 includes a central dielectric support layer 52 with first and second reflector layers 54a and 54b on opposing major surfaces thereof. By inserting the dielectric layer between the reflector layers, the flake 50 is significantly stabilized and strengthened, having increased rigidity. Additional dielectric layers (not shown) may optionally be added to overlie reflector layers 54a and 54b. These additional dielectric layers can add durability, rigidity, and environmental resistance to flake 50. The flake 50 can be used as a pigment flake by itself or can be used as a reflector core section with additional layers applied thereover. The reflector layers 54a and 54b can be formed of any of the reflector materials described previously. The flake 50 has a diffractive structure 56 formed on at least one surface thereof. The grating frequency and depth of diffractive structure 56 can be determined and formed as described hereinabove.

The dielectric material used for support layer 52 is preferably inorganic, since inorganic dielectric materials have been found to have good characteristics of brittleness and rigidity. Various dielectric materials that can be utilized include metal fluorides, metal oxides, metal sulfides, metal nitrides, metal carbides, combinations thereof, and the like. The dielectric materials may be in either a crystalline, amorphous, or semicrystalline state. These materials are readily available and easily applied by physical or chemical vapor deposition processes, or other wet chemical processes such as sol-gel coating. Examples of suitable dielectric materials include magnesium fluoride, silicon monoxide, silicon dioxide, aluminum oxide, titanium dioxide, tungsten oxide, aluminum nitride, boron nitride, boron carbide, tungsten carbide, titanium carbide, titanium nitride, silicon nitride, zinc sulfide, glass flakes, diamond-like carbon, combinations thereof, and the like. Alternatively, support layer 52 may be composed of a preformed dielectric or ceramic preflake material having a high aspect ratio such as a natural platelet mineral (e.g., mica peroskovite or talc), or synthetic platelets formed from glass, alumina, silicon dioxide, carbon, micaeous iron oxide, coated mica, boron nitride, boron carbide, graphite, bismuth oxychloride, various combinations thereof, and the like.

In an alternative embodiment, instead of a dielectric support layer, various semiconductive and conductive materials having a sufficient ratio of tensile to compressive strength can function as a support layer. Examples of such materials include silicon, metal silicides, semiconductive compounds formed from any of the group III, IV, or V elements, metals having a body centered cubic crystal structure, cermet compositions or compounds, semiconductive glasses, various combinations thereof, and the like. It will be appreciated from the teachings herein, however, that any support material providing the functionality described herein and capable of acting as a rigid layer with glass-like qualities would be an acceptable substitute for one of these materials.

The thickness of support layer 52 can be in a range from about 10 nm to about 1,000 nm, and preferably from about 50 nm to about 200 nm, although these ranges should not be taken as limiting.

Alternatively, flake 50 can be formed as an encapsulated particle, as illustrated by the phantom lines in FIG. 6. The particle is a two layer design with a reflector layer 54 substantially surrounding and encapsulating a central support layer 52 such as a dielectric layer. By inserting the support layer within the diffractive layer, the encapsulated particle is significantly stabilized and rigid. The encapsulated particle can be used as a pigment particle by itself or can be used as a diffractive core section with additional layers applied thereover. For example, an outer dielectric layer may be added to overlie and encapsulate reflector layer 54. This outer dielectric layer adds durability, rigidity, and environmental resistance to the encapsulated particle.

Various modifications and combinations of the foregoing embodiments are also considered within the scope of the invention. For example, additional dielectric, absorber, and/or other optical coatings can be formed around each of the above flake embodiments, or on a composite reflective film prior to flake formation, to yield further desired optical characteristics. Such additional coatings can provide additional color effects to the pigments.

Preferably, the flakes of the invention have a thickness of less than about 3 $\mu$m, more preferably less than about 2 $\mu$m. As to length and width, each flake will have a different dimension due to the fracturing process used to form the flakes. However, the median flake size, width and length, is preferably from about 5 $\mu$m to about 200 $\mu$m, more preferably from about 5 $\mu$m to about 100 $\mu$m, and most preferably from about 18 $\mu$ to about 22 $\mu$m.

Because the diffractive effects produced by the pigment flakes of the invention are purely geometrical, the diffractive colors are independent of the physical-chemical causes of the production of the background color of the flakes. The background color is produced by distinct causes, such as transitions involving excitation of electrons resulting in fluorescence, phosphoresence, and the like. In addition, the background color can be caused by transitions between molecular orbitals, such as in the case of most dyes, or by transitions involving energy bands in materials such as metals, semiconductors, color centers, and the like.

The degree of visible diffractive effects varies with the grating frequency. For example, paints with flakes having a 500 ln/mm frequency lose the visual diffractive effects while diffractive effects are enhanced for flakes with higher frequencies such as 1400 or 2000 ln/mm. In fact, grating microstructure frequencies of up to about 3000 ln/mm can be achieved on flakes obtained from multi-layer optical stacks. The optical effects produced by the flakes can be tailored depending on the geometrical microstructure of the flakes.

The pigment flakes of the present invention can be interspersed within a pigment medium to produce a diffractive composition such as an ink, paint, or the like, which can be applied to a wide variety of objects or papers. The pigment flakes can also be dispersed within a pigment medium such as an plastic material which can be molded or extruded to form an object which has diffractive effects. The pigment flakes can also be dispersed within a pigment medium such as a cosmetic formulation or automotive paints.

The pigment flakes added to a medium produces a predetermined optical response through radiation incident on a surface of the solidified medium. Preferably, the pigment medium contains a resin or mixture of resins which can be dried or hardened by thermal processes such as thermal cross-linking, thermal setting, or thermal solvent evaporation or by photochemical cross-linking. Useful pigment media include various polymeric compositions or organic binders such as alkyd resins, polyester resins, acrylic resins, polyurethane resins, vinyl resins, epoxies, styrenes, and the like. Suitable examples of these resins include melamine, acrylates such as methyl methacrylate, ABS resins, ink and paint formulations based on alkyd resins, and various mixtures thereof. The flakes combined with the pigment media produce a diffractive composition that can be used directly as a paint, ink, or moldable plastic material. The diffractive composition can also be utilized as an additive for conventional paint, ink, or plastic materials.

The pigment medium also preferably contains a solvent for the resin. For the solvent, generally, either an organic solvent or water can be used. A volatile solvent can also be used in the medium. As for the volatile solvent, it is preferable to use a solvent which is both volatile as well as dilutable, such as a thinner. In particular, faster drying of the pigment medium can be achieved by increasing the amount of the solvent with a low boiling point composition such as methyl ethyl ketone (MEK).

In addition, the diffractive flakes of the invention can be optionally blended with various additive materials such as conventional non-diffractive pigment flakes, particles, or dyes of different hues, chroma and brightness to achieve the color characteristics desired. For example, the flakes can be mixed with other conventional pigments, either of the interference type or noninterference type, to produce a range of other colors. This preblended composition can then be dispersed into a polymeric medium such as a paint, ink, plastic or other polymeric pigment vehicle for use in a conventional manner.

Examples of suitable additive materials that can be combined with the flakes of the invention include non-color shifting high chroma or high reflective platelets which produce unique color effects, such as $MgF_2/Al/MgF_2$ platelets, or $SiO_2/Al/SiO_2$ platelets. Other suitable additives that can be mixed with the diffractive color shifting flakes include lamellar pigments such as multi-layer color shifting flakes, aluminum flakes, graphite flakes, glass flakes, iron oxide, boron nitride, mica flakes, interference based $TiO_2$ coated mica flakes, interference pigments based on multiple coated plate-like silicatic substrates, metal-dielectric or all-dielectric interference pigments, and the like; and non-lamellar pigments such as aluminum powder, carbon black, ultramarine blue, cobalt based pigments, organic pigments or dyes, rutile or spinel based inorganic pigments, naturally occurring pigments, inorganic pigments such as titanium dioxide, talc, china clay, and the like; as well as various mixtures thereof. For example, pigments such as aluminum powder or carbon black can be added to control lightness and other color properties.

The pigment flakes of the invention can be easily and economically utilized in paints and inks which can be applied to various objects or papers, such as motorized vehicles, currency and security documents, household appliances, architectural structures, flooring, fabrics, sporting goods, electronic packaging/housing, product packaging, beverage containers, and the like. The flakes can also be utilized in forming colored plastic materials, coating compositions, extruded parts, electrostatic coatings, glass, and ceramic materials.

The diffractive pigment flakes can have a preselected size and loading in the pigment medium to produce an ink suitable for use in a printing process such as intaglio, lithography, silk screen, gravure, doctor blade, and wet coating. The diffractive pigment flakes are also suitable for dispersion in conventional paint vehicles or resins such as those compatible with conventional painting methods, particularly for painting motorized vehicles or other structures requiring a base, middle, and top coat, and the like. The diffractive pigments are also suitable for decorative application in cosmetic formulations, laminating films, and the like.

A coated article according to the invention includes an object having a surface, and a diffractive coating layer overlying at least a portion of the surface. The coating layer comprises a diffractive composition including a pigment medium as described previously, and a plurality of diffractive pigment flakes dispersed in the pigment medium. The coated article can further include a base coating layer, which can include a precoat, a prime coat, and/or a sealer coat, applied to an object prior to applying the diffractive coating layer. A transparent top coating layer such as a clear coat can be applied over the diffractive coating layer. Such a coating layer structure would typically be produced in painting a motor vehicle such as an automobile. Further details of such a coating layer structure are set forth in U.S. Pat. No. 5,571,624 to Phillips et al., which is incorporated by reference herein.

Figure 7A:
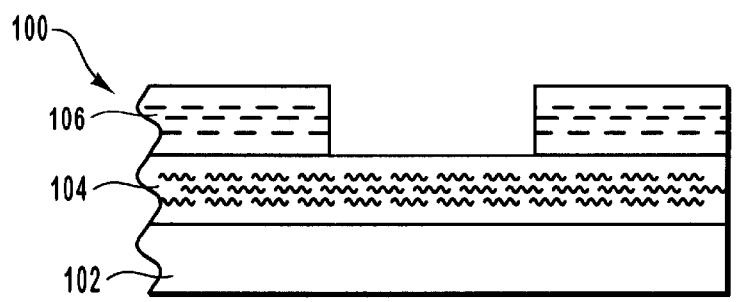
FIGS. 7A and 7B are schematic representations of multi-coated articles wherein one of the coating layers incorporates diffractive pigment flakes and the other coating layer has non-diffractive flakes.
Figure 7B:
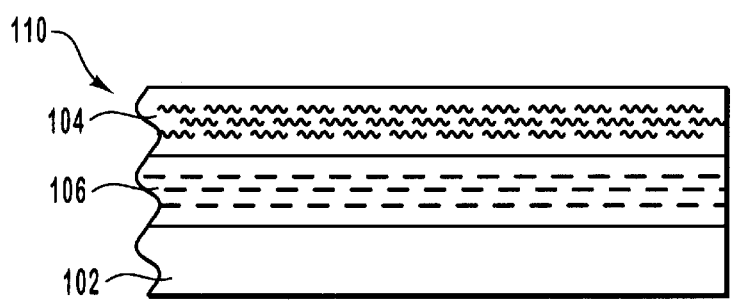

Alternatively, the coated article can further include a non-diffractive coating layer under the diffractive coating layer, or a non-diffractive coating layer partially overlying the diffractive coating layer, thereby forming a diffractive pattern on the object. Such coating structures are illustrated in FIGS. 7A and 7B, which show a multi-coating application where one of the coating layers incorporates diffractive flakes according to the invention and the other coating layer has non-diffractive flakes. For example, FIG. 7A shows a coated article 100 including a surface section 102 having a diffractive coating layer 104 thereon. A non-diffractive coating layer 106 partially overlies diffractive coating layer 104, thereby producing a diffractive pattern which follows the exposed surface of diffractive coating layer 104. FIG. 7B depicts a coated article 110 with an opposite coating configuration, in which a diffractive coating layer 104 overlies a non-diffractive coating layer 106.

Figure 8:
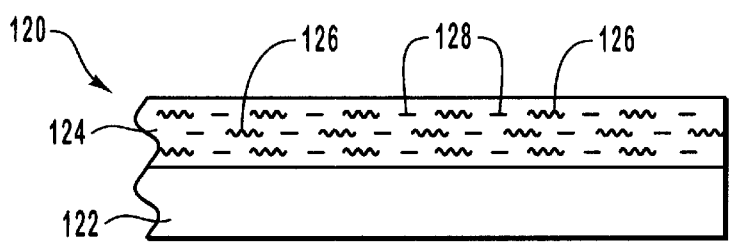
FIG. 8 is a schematic representation of a coated article having a single coating layer which includes a mixture of diffractive and non-diffractive pigment flakes.

In yet a further embodiment, the coated article can comprise a single coating layer with a mixture of diffractive and non-diffractive pigment flakes therein. For example, FIG. 8 depicts a coated article 120 including a surface section 122 having a coating layer 124 thereon. The coating layer 124 includes a plurality of diffractive flakes 126 and non-diffractive flakes 128 interspersed in a pigment medium.

The diffractive pigments of the invention are capable of providing bright distinct colors when applied to the surface of an object such as by printing an ink or applying a paint containing the pigments. The diffractive pigments also provide bright distinct colors by integral coloration of an object molded from a resin containing the pigments. A printed or irregularly shaped object having a diffractive pigment coating or coloration has the appearance of having a continuous holographic or diffraction grating foil on the object such that the dominant coloration of a region of the object is a function of the juxtaposition of the illumination source and the viewer.

The diffractive compositions of the invention applied to an object also produce a substantially continuous tone iridescent diffractive effect. The compositions also produce a substantially uniform and continuous color range observable under a mixture of diffuse and specular or directional illumination when applied to a curved object.

The diffractive pigment flakes are suitable for providing additional forgery and photocopy proof features on security documents as well as authentication features on high value and/or critical parts and supplies. For example, the pigment flakes can be used to form an optical security device comprising a first region, a second region, and an assembly of the pigment flakes in at least one of the first or second regions. The pigment flakes have a diffractive structure comprising a sequence of substantially equally spaced linear features that provides for a decrease in a zero order diffracted light beam and a sufficient increase in a first or higher order diffracted light beam such that the appearance of the security device is dominated by the dispersion of light by first or higher order reflections.

The following examples are given to illustrate the present invention, and are not intended to limit the scope of the invention.

EXAMPLES

In order to quantify the color characteristics of a particular object, it is useful to invoke the L*a*b* color coordinate system developed by the Commission Internationale de l'Eclairage (CIE), which is now used as a standard in the industry in order to precisely describe color values. In this system, L* indicates lightness and a* and b* are the chromaticity coordinates. The L*a*b*color system was used to generate various a*b* diagrams described in some of the following examples which plot the color trajectory and chromaticity of a selected diffractive pigment.

The L*a*b* color system allows for a comparison of the color differences between two measurements through the parameter $\Delta E_{ab}$, which indicates the change in color as measured in the L*a*b* color space, such as the color difference of two different pigment designs. The numerical value for $\Delta E_{ab}$ is calculated through the following equation using the measured L*a*b* values:

$$\Delta E_{ab} = [(\Delta L^*)^2 + (\Delta a^*)^2 + (\Delta b^*)^2]^{1/2}$$

where the symbol $\Delta$ denotes the difference in measurements being compared.

The Laneta draw-downs described in some of the following examples were analyzed using a Murakami Gonio-Photospectrometer. A "draw-down" is a paint or ink sample spread on paper to evaluate the color. Typically, a draw-down is formed with the edge of a putty knife or spatula by "drawing down" a small glob of paint or ink to get a thin film of the paint or ink. Alternatively, the draw-down is made using a Mayer rod pulled across a Laneta card and through a small glob of paint. The Murakami device, in the selected configuration, provides information for a fixed illumination position (45°) and variable viewer angle (−80° to 80°) related to the sample lightness (L*) and the a*,b* chromaticity coordinates in the L*a*b* color space for the measured sample.

Examples 1–7

The amount of energy relative to the incident energy (efficiency) of diffractive gratings varies as a function of the type of grating and its groove depth. As a result gratings can be optimized for specific wavelengths. The light spectrum distribution in the various diffracted orders for any wavelength will be given by equation 1 set forth previously.

Various diffractive gratings (Examples 1–7) having from 500 ln/mm to 3000 ln/mm were modeled using conventional optical software to determine optimal grating configurations. FIGS. 9–14 are graphs of the modeling results, showing diffraction angles as a function of various wavelengths for the various diffractive gratings of Examples 1–7. In particular, FIGS. 9–14 show the diffraction angles for various visible wavelengths (400 nm violet to 700 nm red) at normal and 45° incidence. Table 1 below sets forth the specific Example number with the corresponding Figure number and grating structure that was modeled.

TABLE 1

| Example | FIG. | Grating Structure |
|---------|------|-------------------|
| 1 | 9 | 500 ln/mm grating |
| 2 | 10 | 1000 ln/mm grating |
| 3 | 11 | 1400 ln/mm grating |
| 4 | 12 | 2000 ln/mm grating |
| 5 | 13 | 2400 ln/mm grating |
| 6 | 14 | 2500 ln/mm grating |
| 7 | 14 | 3000 ln/mm grating |

Figure 9:
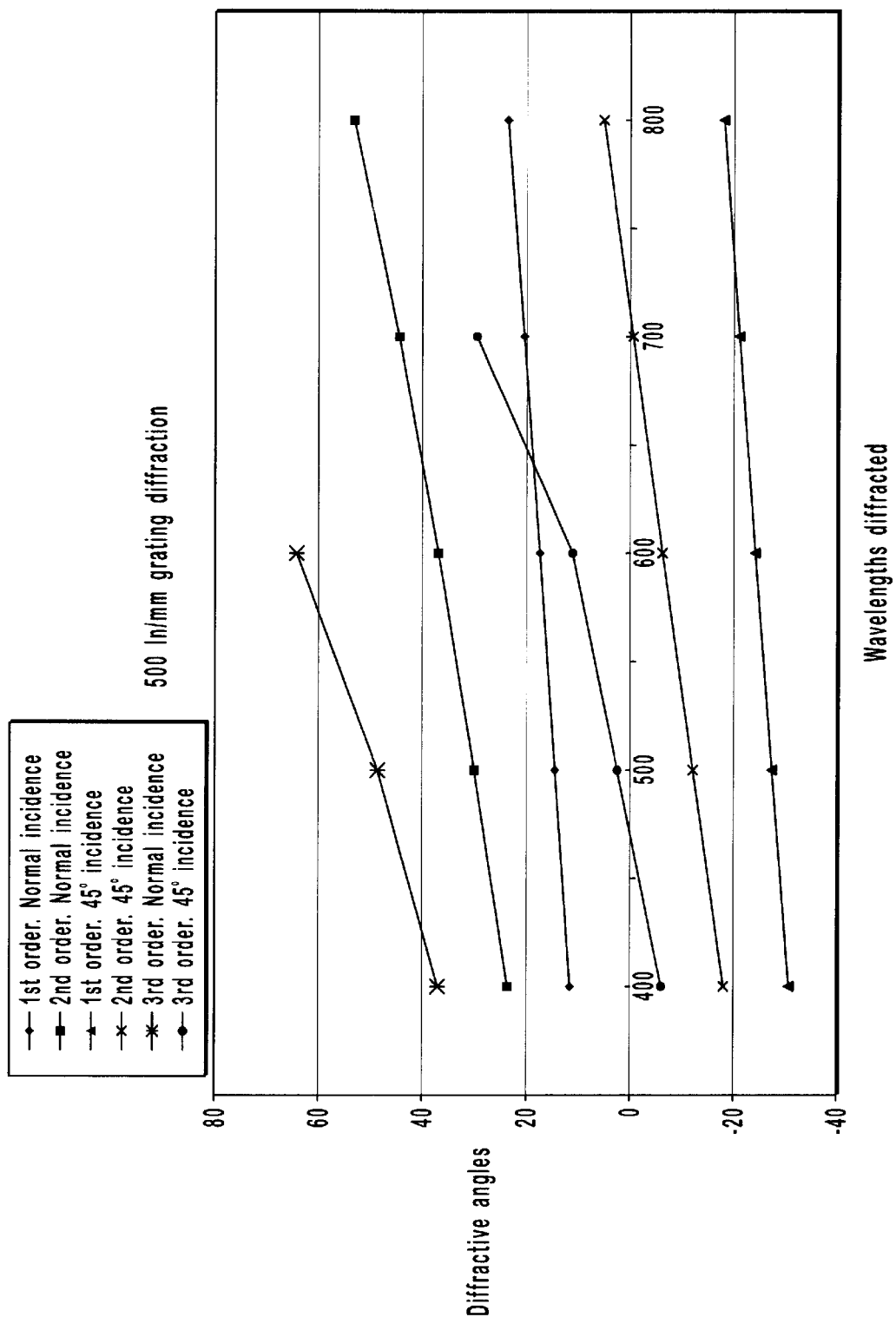
FIG. 9 is a graph illustrating the diffraction angle for various wavelengths at normal and 45° incidence for a diffractive grating having 500 ln/mm.
Figure 10:
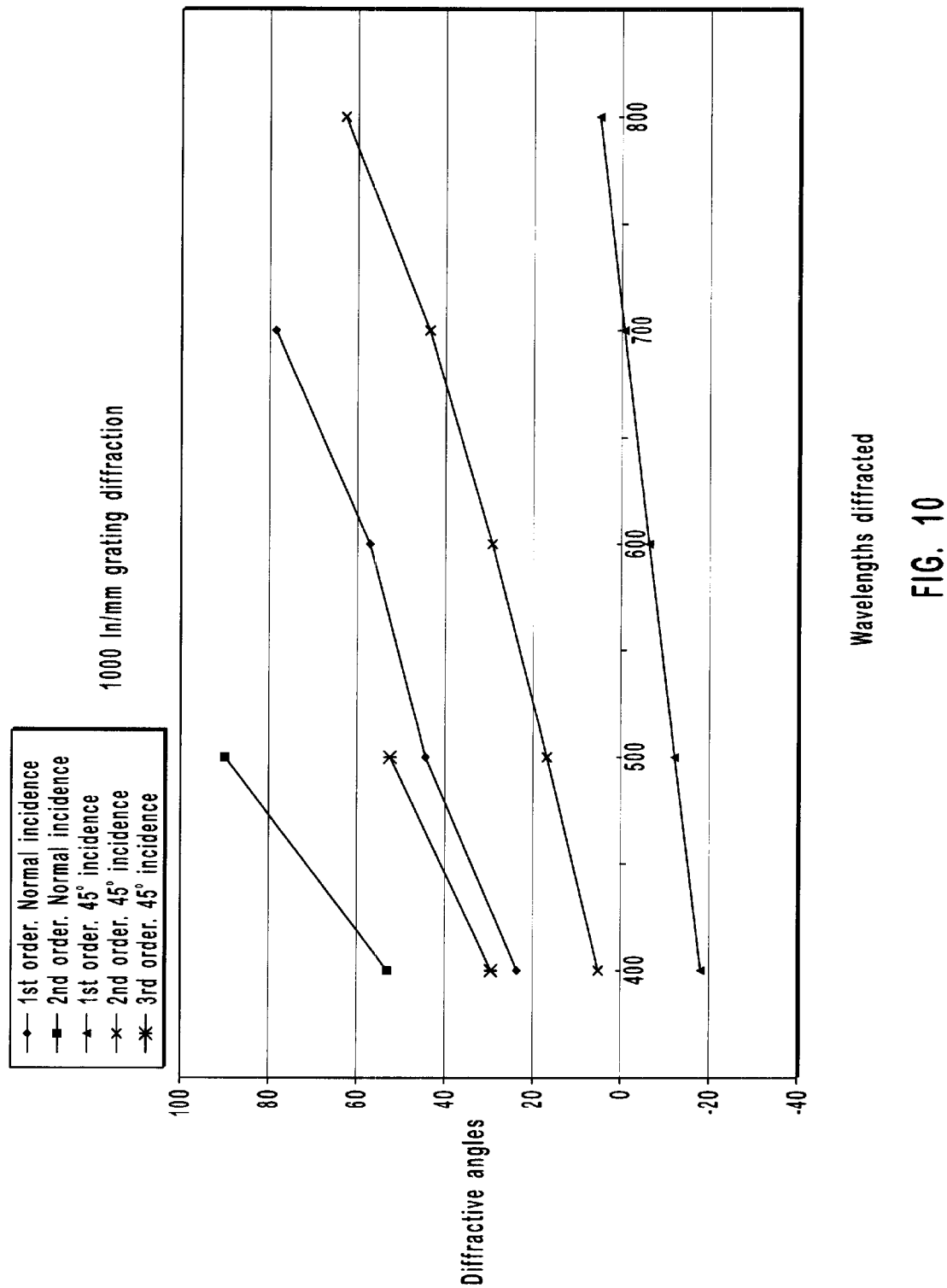
FIG. 10 is a graph illustrating the diffraction angle for various wavelengths at normal and 45° incidence for a diffractive grating having 1000 ln/mm.
Figure 11:
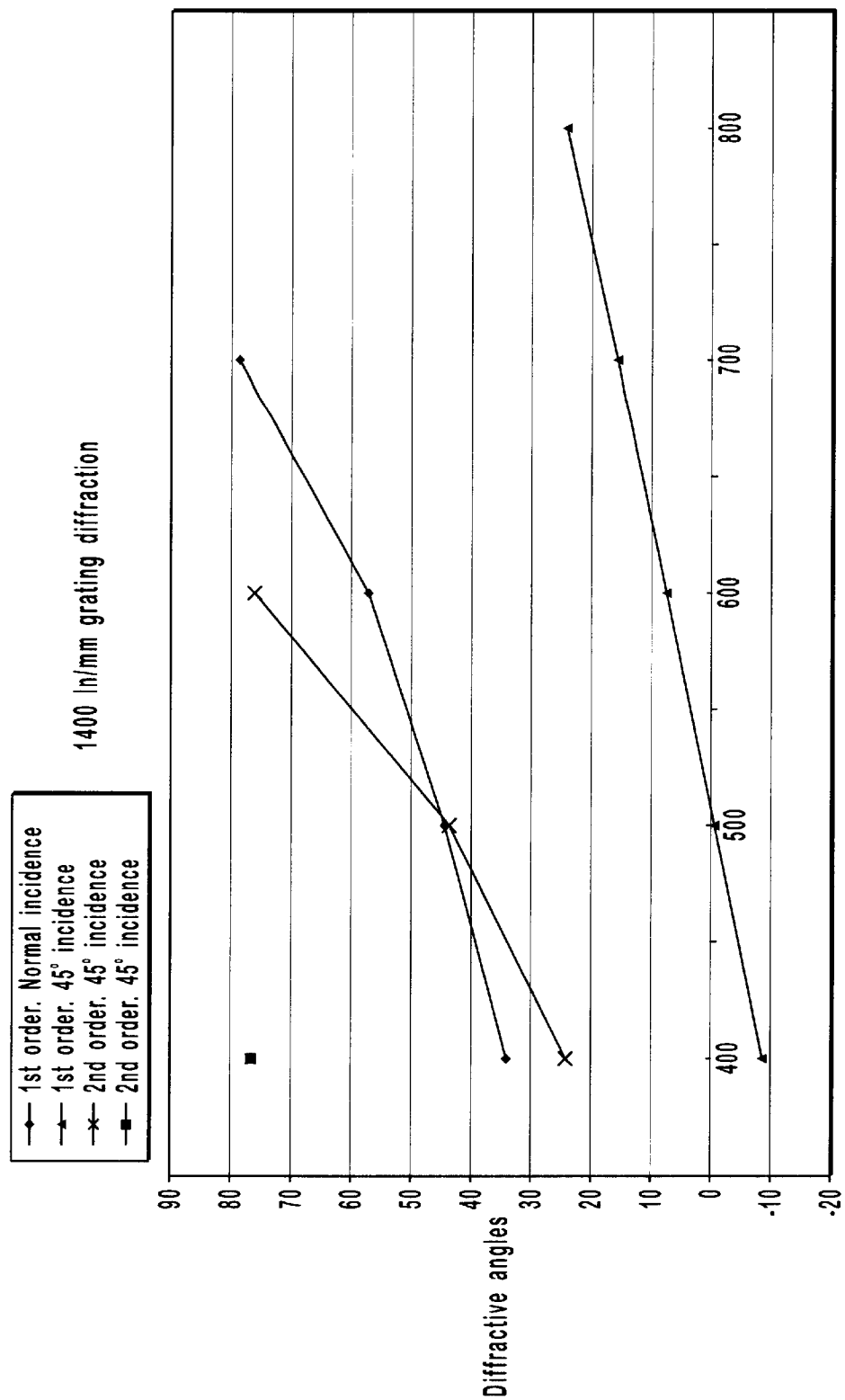
FIG. 11 is a graph illustrating the diffraction angle for various wavelengths at normal and 45° incidence for a diffractive grating having 1400 ln/mm.
Figure 12:
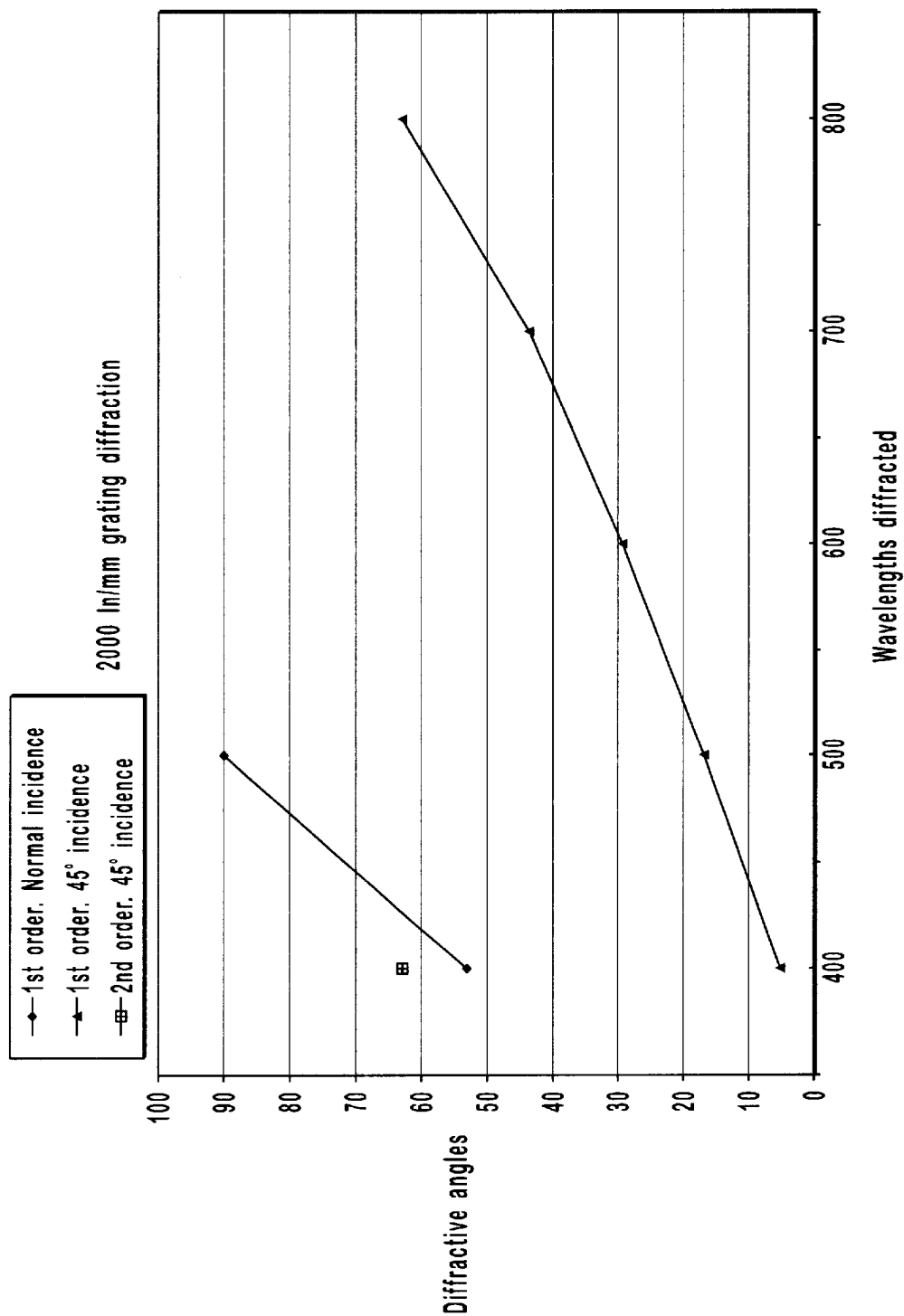
FIG. 12 is a graph illustrating the diffraction angle for various wavelengths at normal and 45° incidence for a diffractive grating having 2000 ln/mm.
Figure 13:
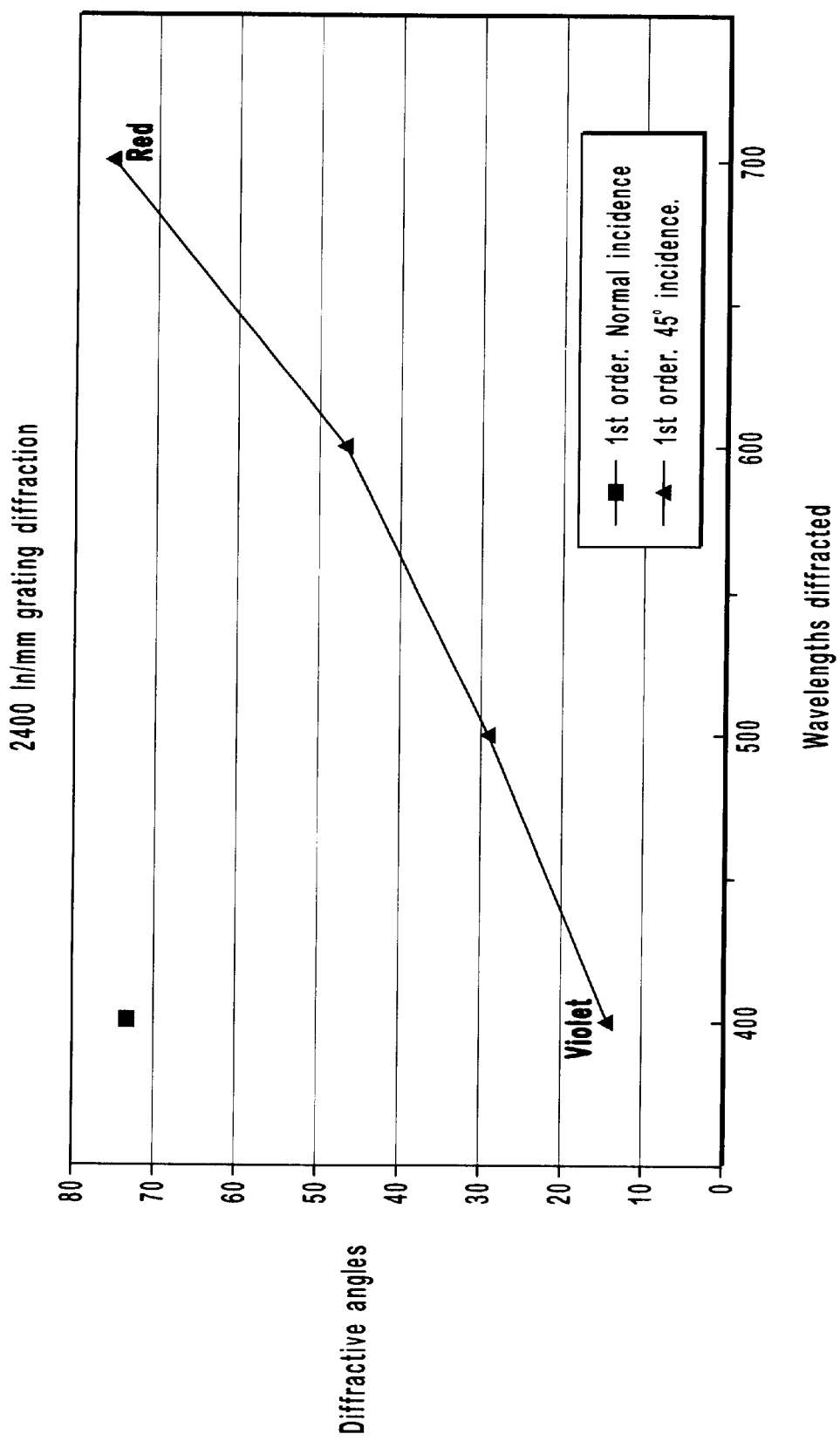
FIG. 13 is a graph illustrating the diffraction angle for various wavelengths at normal and 45° incidence for a diffractive grating having 2400 ln/mm.
Figure 14:
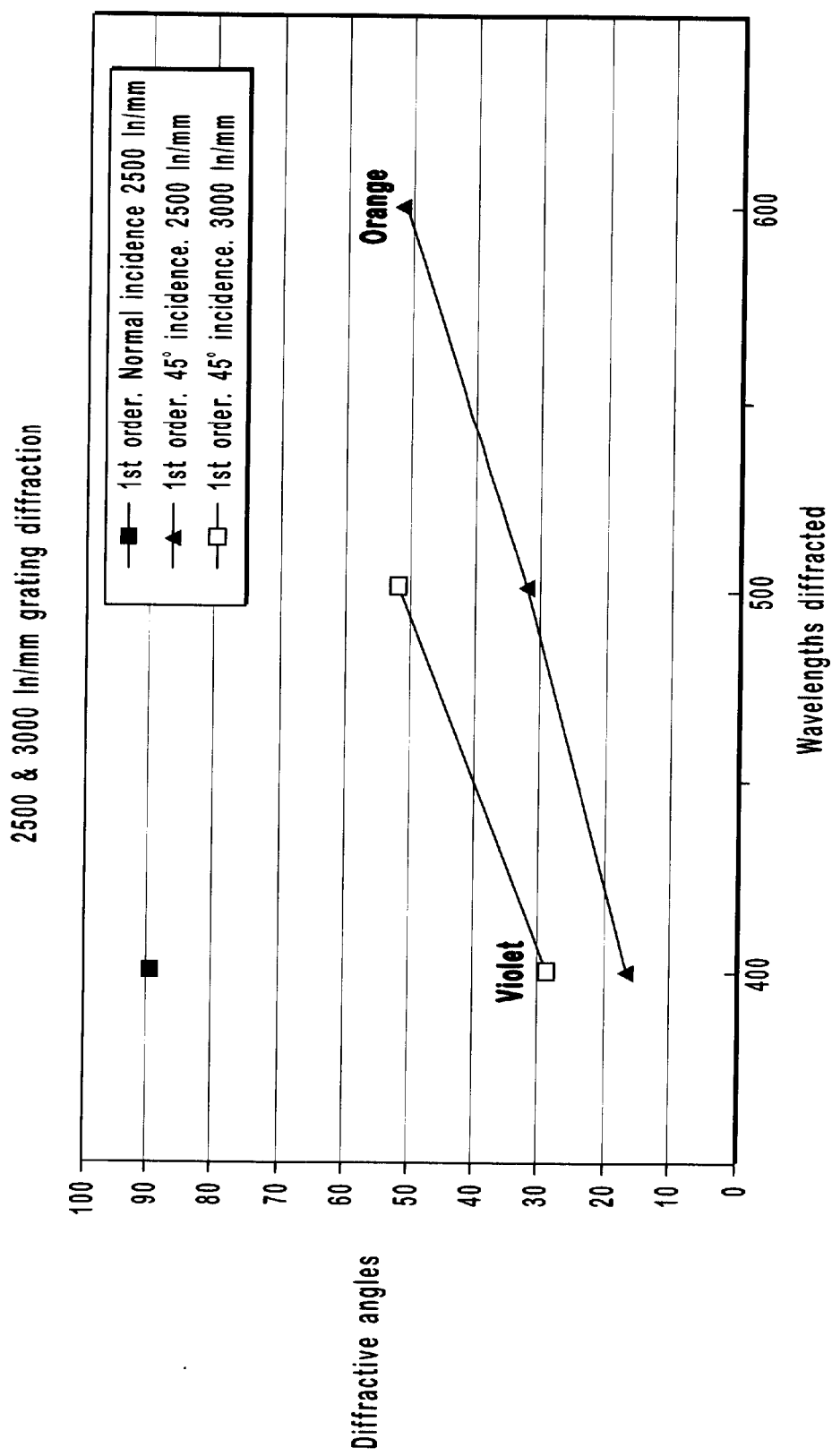
FIG. 14 is a graph illustrating the diffraction angle for various wavelengths at normal and 45° incidence for a diffractive grating having 2500 ln/mm and a diffractive grating having 3000 ln/mm.

For the 500 ln/mm grating (Example 1), the $2^{nd}$ and $3^{rd}$ order spectra overlap for both normal and 45° incidence, as shown in FIG. 9. In the case of the 1000 ln/mm grating (Example 2), overlapping occurs for the $1^{st}$ and $2^{nd}$ order at normal and 45° incidence, as shown in FIG. 10. No overlapping is observed at a frequency equal to or higher than 1400 ln/mm (Examples 3–7), as shown in FIGS. 11–14.

Example 8

Figure 15:
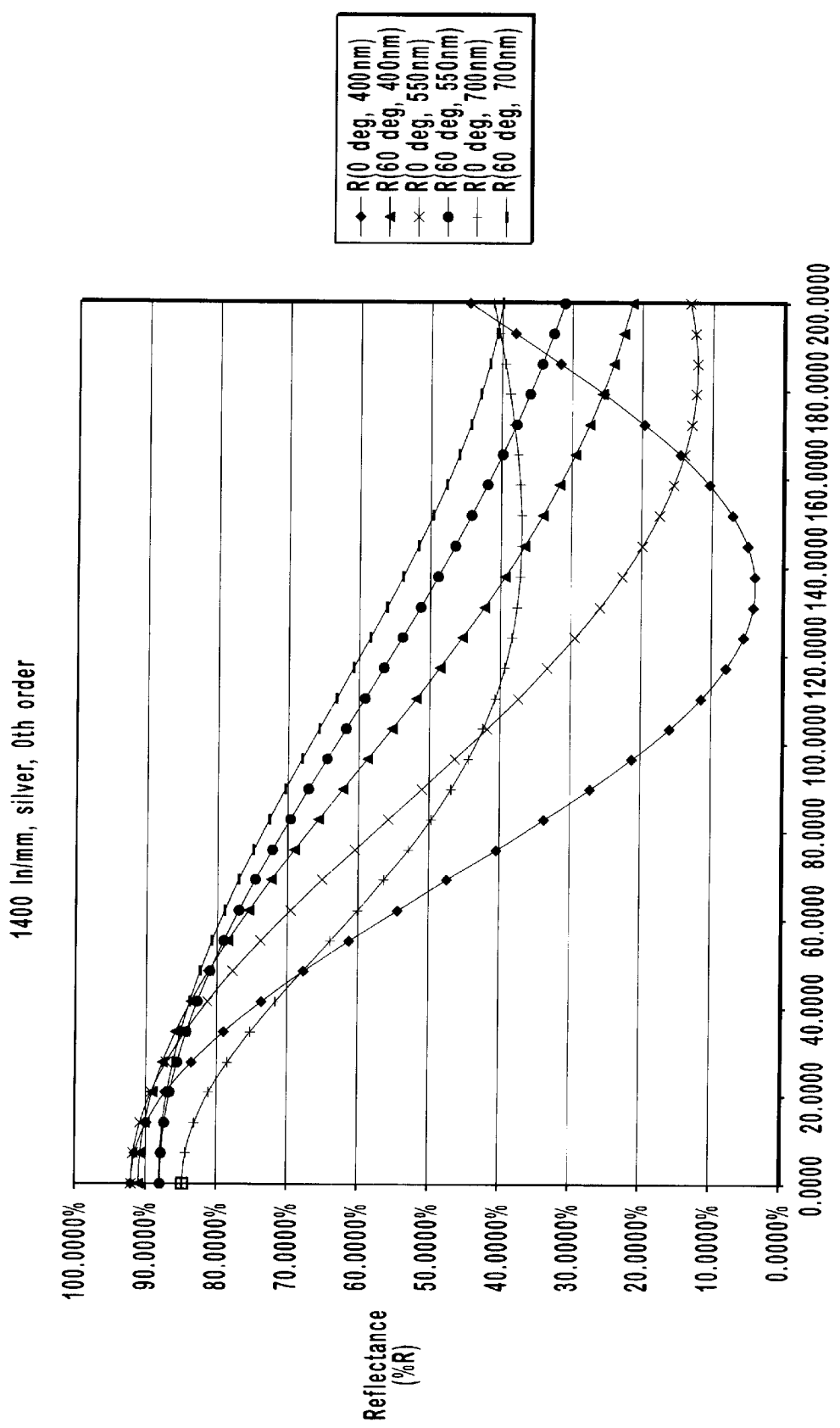
FIGS. 15 and 16 are graphs showing the theoretical efficiency of 1400 ln/mm aluminized sinusoidal gratings at various groove depths at normal and 60° incidence for various wavelengths of light.
Figure 16:
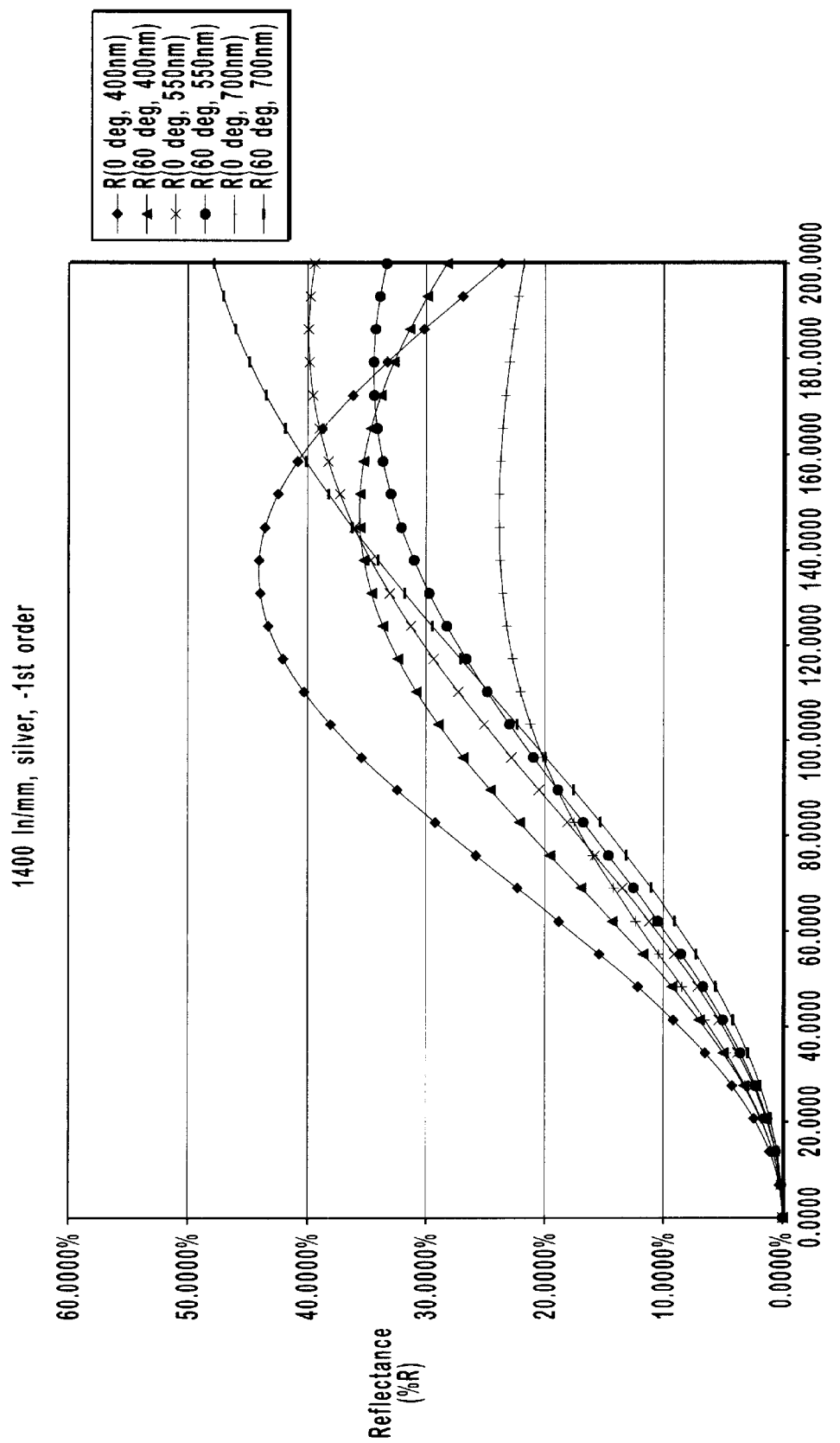

An aluminized sinusoidal diffractive grating having 1400 ln/mm was modeled using conventional optical software. FIGS. 15 and 16 are graphs showing the theoretical efficiency (percent reflectance) of the grating at various groove depths at normal and 60° incidence for 400, 550 and 700 nm wavelength light. The results of the modeling showed that a groove depth close to about 160 nm is a good comprise to get a minimum zero order and a maximum $1^{st}$ order contribution, thereby enhancing the diffractive effects of the grating.

Using the same criteria, the optimum groove depth was determined to be about 220 nm for a 2000 ln/mm grating, and about 116 nm for a 3000 ln/mm grating.

Examples 9–10

Figure 17:
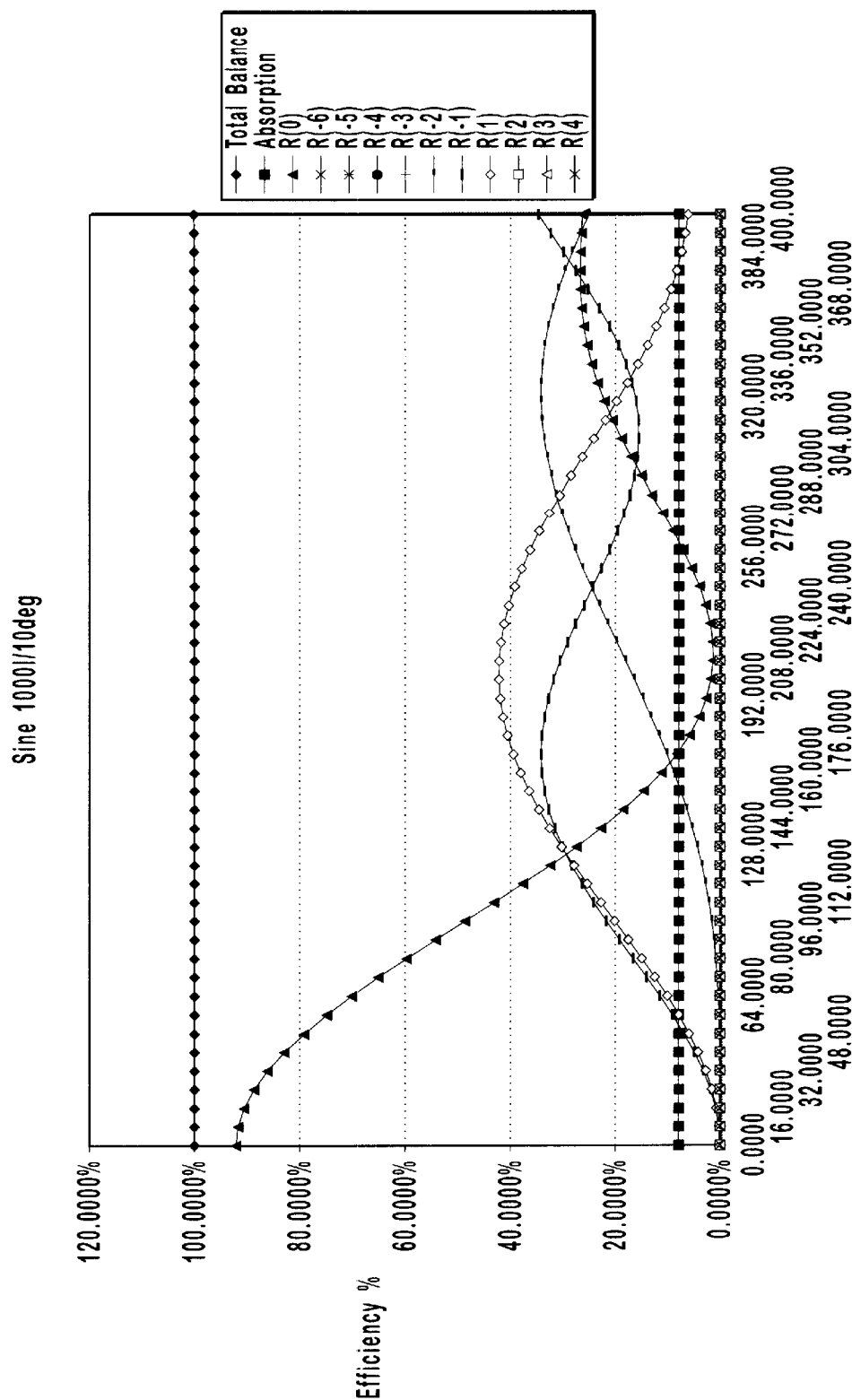
FIGS. 17 and 18 are graphs showing the theoretical efficiency of 1000 ln/mm aluminized sinusoidal and square-wave gratings at various groove depths.
Figure 18:
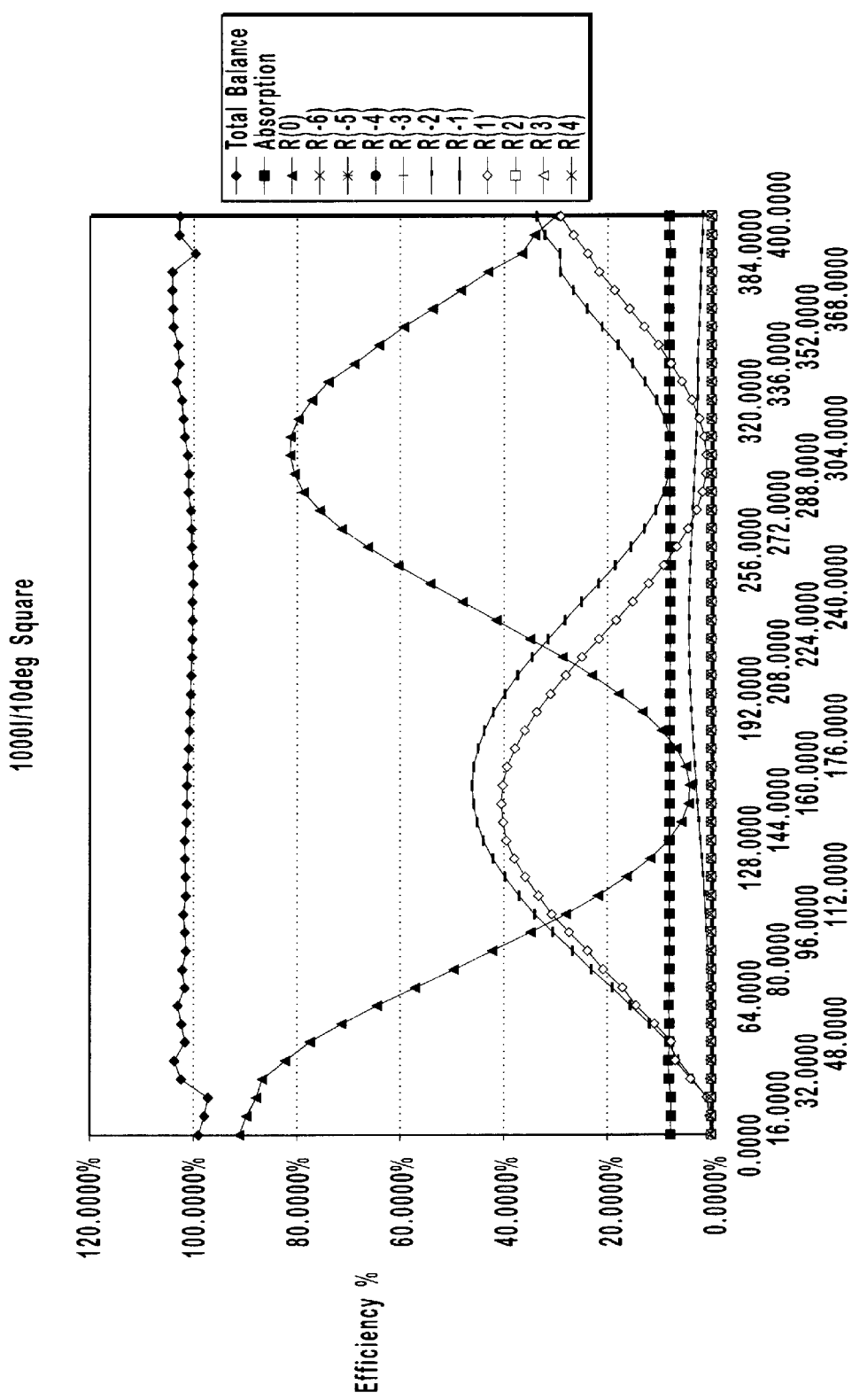

An aluminized sinusoidal diffractive grating having 1000 ln/mm (Example 9), and an aluminized square-wave diffractive grating having 1000 ln/mm (Example 10) were modeled using conventional optical software. The grating of Example 10 was symmetrical, with a ratio between the length of the top of the line and the grating period equal to 0.5. FIGS. 17 and 18 are graphs showing the theoretical efficiency of the gratings of Examples 9 and 10 at various groove depths and at quasi normal incidence for 550 nm.

The modeling showed that for square-wave gratings having 1000 ln/mm, the maximum of the orders is obtained at a groove depth of about 150 nm that corresponds with the minimum of the zero order. At the same frequency, sinusoidal gratings present a maximum of the $1^{st}$ order and a minimum of the zero order for a groove depth of about 200 nm. However, in contrast with the square-wave configuration, the successive orders in the sinusoidal gratings do not follow the same pattern. Nevertheless, the square-wave configuration does not appear to have a strong benefit in comparison to the sinusoidal grating. Any such benefit becomes even less important considering that for practical purposes, it will be more difficult to strip a square-wave stacked foil than a sinusoidal stacked foil and that for higher grating frequencies the $2^{nd}$ order will no longer exist.

Example 11

Grating foils to be used for pigment fabrication were acquired following the theoretical considerations as disclosed hereinabove. A 1400 ln/mm linear grating was obtained with a depth of 160 nm and a 2000 ln/mm linear grating was obtained with a groove depth of 220 nm. Another grating with a cross (square) morphology and a frequency of 1400 ln/mm was also obtained for comparison with the 1400 ln/mm linear grating. Atomic Force Microscopy was used to verify the frequency and depth of the foil gratings. Additional gratings having 500 ln/mm and 1000 ln/mm were also obtained for comparison with the higher frequency gratings.

Achromatic aluminum diffractive pigments were fabricated according to the present invention by depositing the following thin film layers onto a 60 nm NaCl release layer overlying the various grating foils previously obtained:

$MgF_2/Al/MgF_2$

The $MgF_2$ layers each had an optical thickness of 2 QWOT at 550 nm, and the Al layer had a physical thickness of about 160 nm. The grating foil served as a substrate support to create the thin film stack.

The grating foil and deposited layers were exposed to water, dissolving the NaCl layer, thereby converting the thin film stack into flakes with a large, broad particle size, which was subsequently fragmented to form diffractive flakes. The flakes were ultrasonically ground to more appropriate particle sizes. After grinding, the flakes were added to a paint vehicle and applied to Laneta cards as draw-downs. Some of the diffractive flakes in the paint vehicle were also sprayed onto objects with different shapes to show their decorative appearance.

Figure 19:
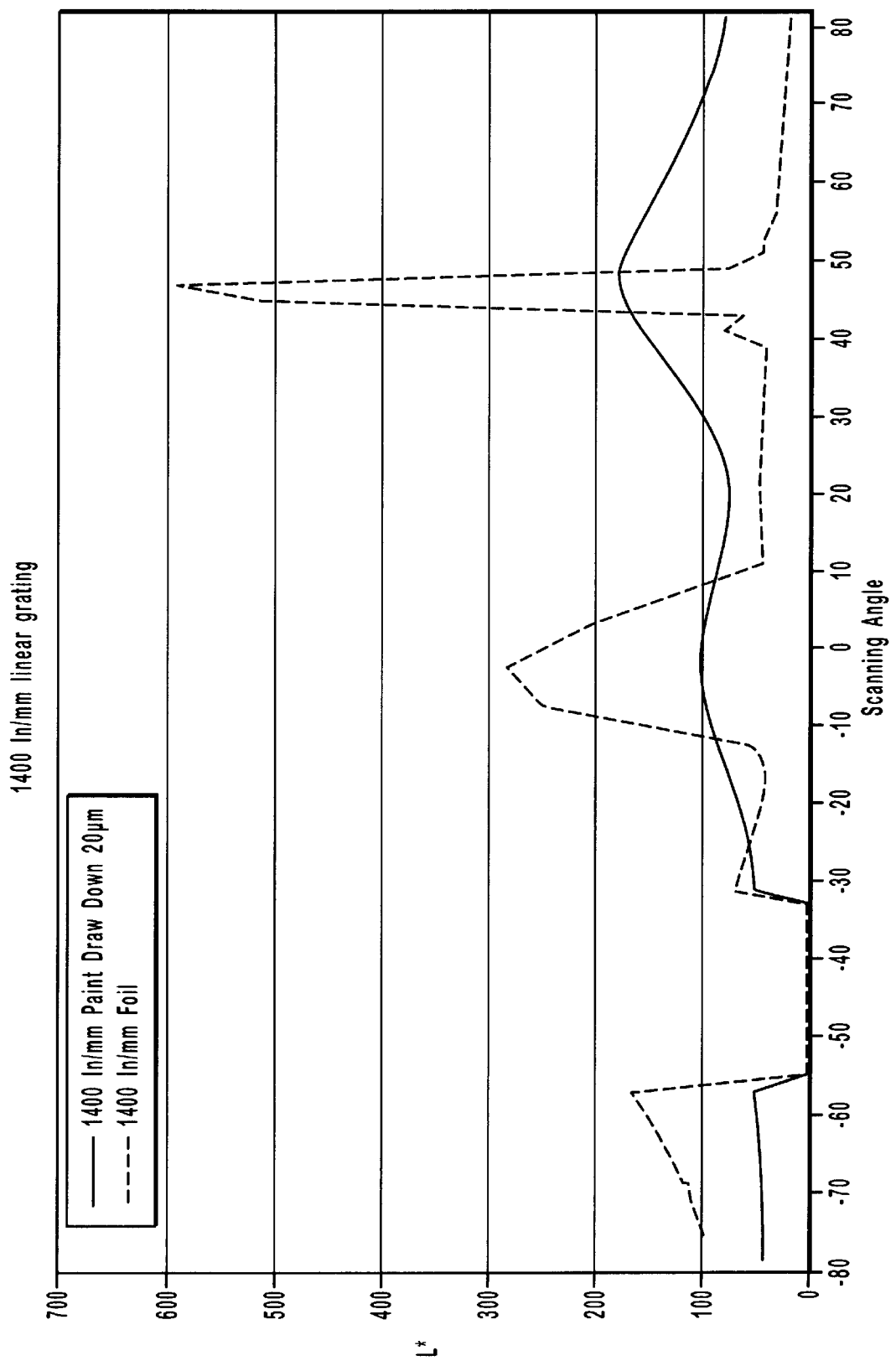
FIGS. 19–21 are graphs illustrating lightness as a function of the viewing angle for various diffractive structures according to the invention.

FIG. 19 is a graph of the lightness (L*) as a function of the viewer or scanning angle for the 1400 ln/mm grating foil and the 1400 ln/mm paint draw-down with a median flake size of about 20 microns. The large peak at 45° corresponds to the zero order or specular diffraction of the grating foil and the peak located between −15° and 10° corresponds to the angular spread of the $1^{st}$ order. The $2^{nd}$ order should have also been observed, and in fact it was partially detected. However, at this position the light source is inbetween the sample and the detector for most of the $2^{nd}$ order angular dispersion. It can be seen that the ensemble of flakes in the form of the paint draw-down still show the diffractive effect, even though with a lower lightness than the foil. The $1^{st}$ order intensity is relatively high, compared to the specular reflectance. This lightness is strong enough to be clearly observed when sprayed onto tri-dimensional objects and illuminated with a point light source.

Figure 20:
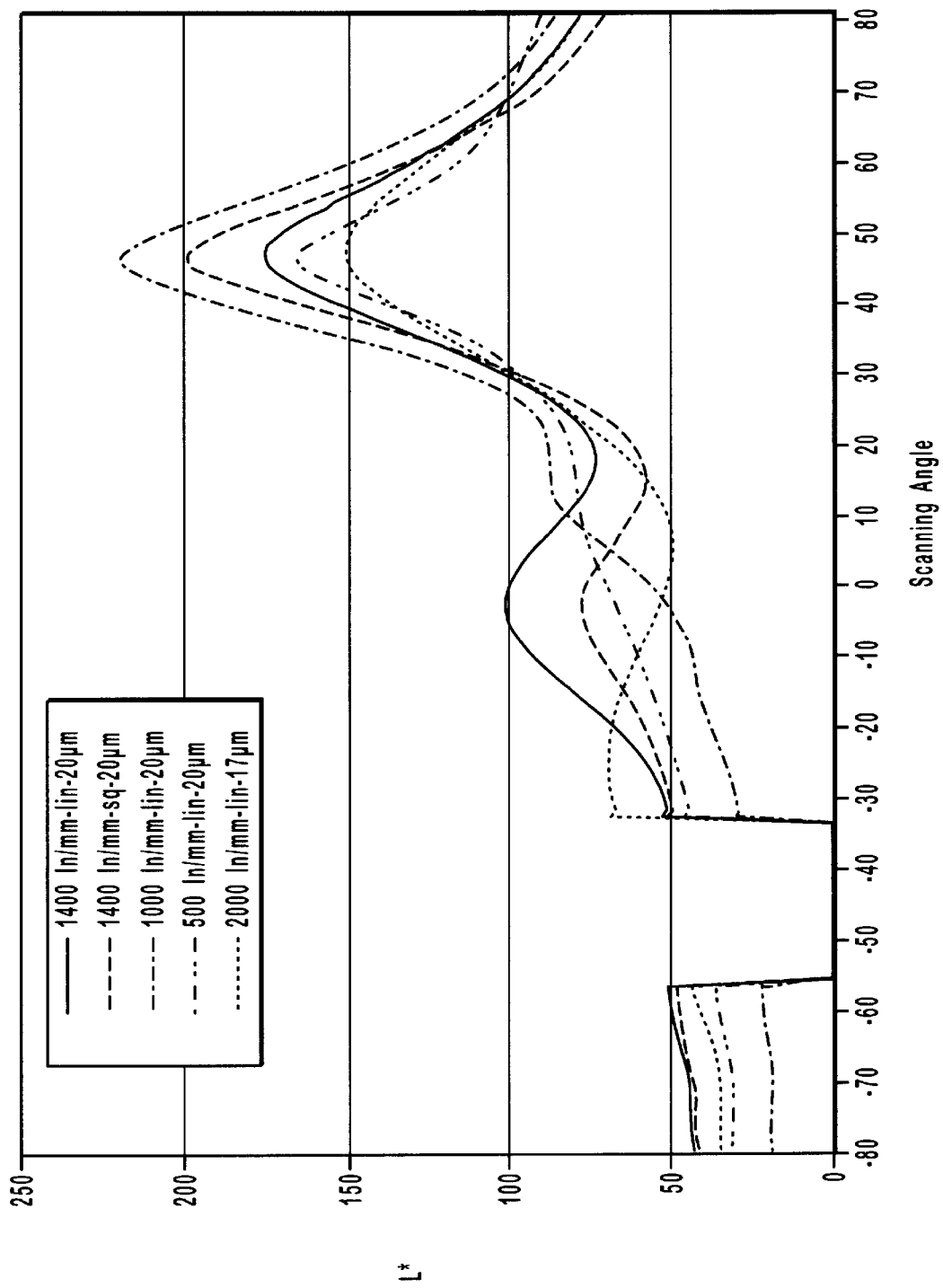

FIG. 20 is a graph of the lightness as a function of the viewer or scanning angle paint draw-down samples obtained with flakes of different frequencies, including 500 ln/mm (linear), 1000 ln/mm (linear), 1400 ln/mm (square and linear), and 2000 ln/mm (linear). The median flake size was for the samples was about 20 microns for comparability except for the 2000 ln/mm sample which had a median flake size of about 17 microns. FIG. 20 shows that the 500 ln/mm grated flakes randomly oriented on a paint draw-down have lost most of the diffractive orders or they are too weak to be observable. The 1000 ln/mm sample showed a weak $1^{st}$ order diffractive effect close to the zero order, but its intensity was much lower than the $1^{st}$ order intensities obtained with the 1400 ln/mm linear and cross grated flakes and the 2000 ln/mm grated flakes. The highest L* zero order/$1^{st}$ order ratio was obtained with the 1400 ln/mm linear sample indicating that this sample should show the highest diffractive effect. However, this result was less conclusive when the flakes were applied as spray paint onto tri-dimensional objects. The 1400 ln/mm linear and cross samples and the 2000 ln/mm sample all showed strong diffractive effects.

Figure 21:
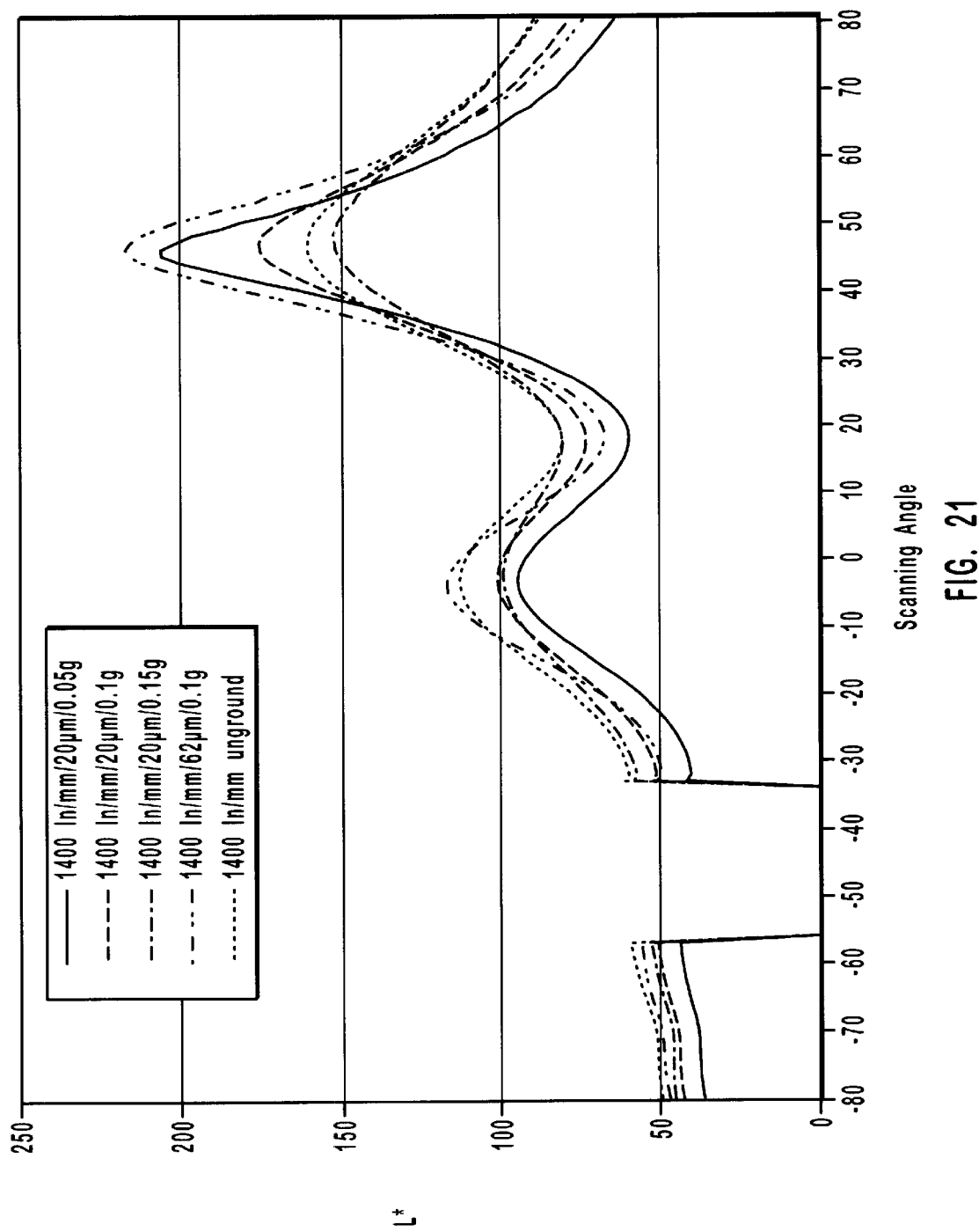

Diffractrive flakes made with the 1400 ln/mm linear grating and having a 20 micron median flake size were used to prepare various draw-down samples. These samples included an amount of 0.05, 0.1, and 0.15 g of flakes respectively mixed with 3.9 g of a paint vehicle. In addition, draw-down samples of unground flakes, and flakes having a 62 micron median particle size, were also prepared from the same coating run as the samples having a 20 micron median flake size. FIG. 21 is a graph of the lightness as a function of the viewer or scanning angle for these paint draw-down samples. Based on diffraction theory and the definition of the resolving power, the bigger the flake size the stronger the diffraction effect. This was corroborated by the 62 micron and unground flake samples, which showed the highest $1^{st}$ order effect. It is also known that in the case of ungrated flakes, the particle size, thickness, and curl strongly influence the optimized flake to vehicle ratio in the preparation of a paint draw-down. The draw-down prepared with the 0.15/3.9 flake to paint ratio showed the weakest diffractive effect, most probably due to a non-suitable leafing condition.

Figure 22:
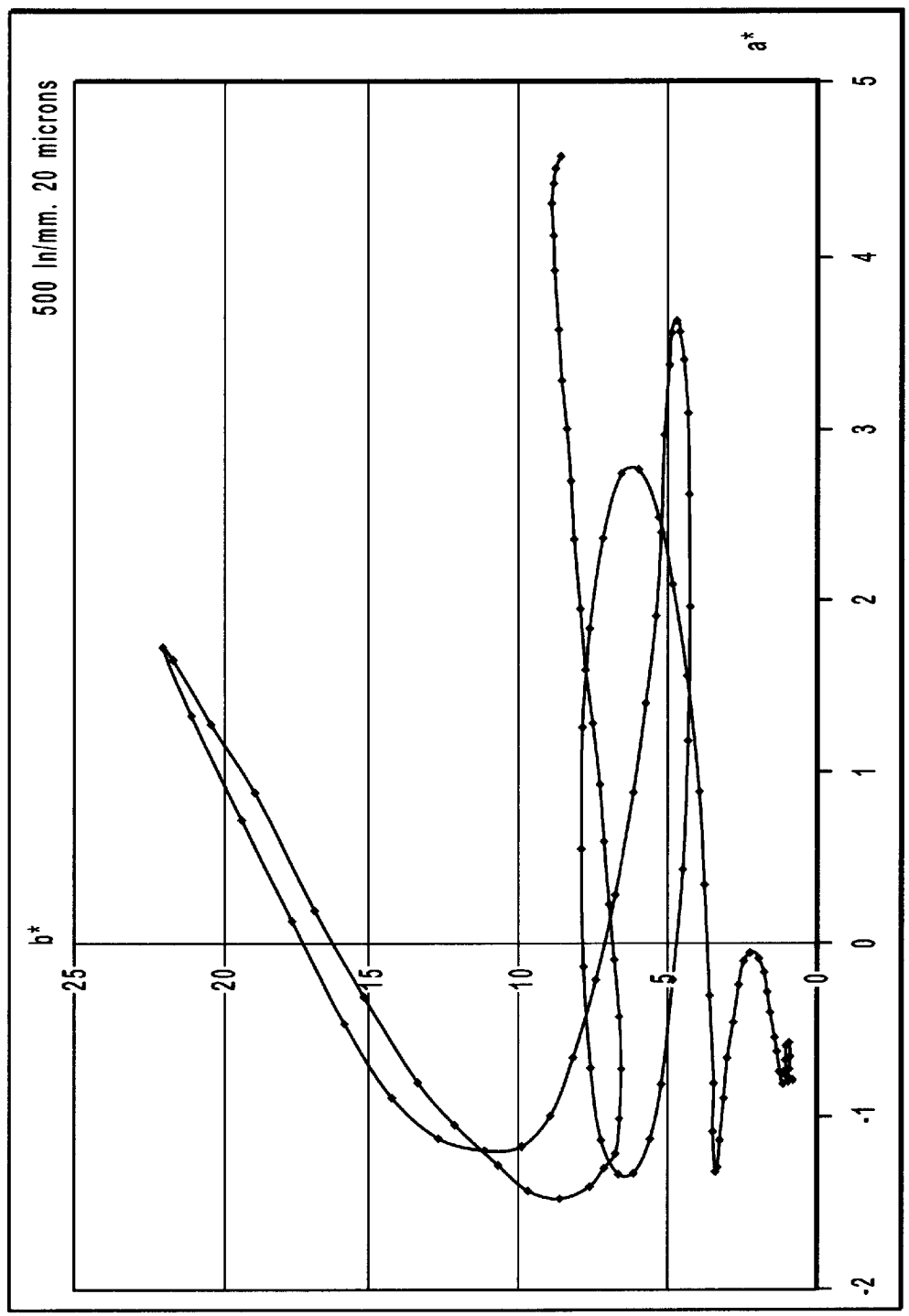
FIGS. 22–25 are a*b* diagrams which plot the color trajectory and chromaticity of various diffractive structures made according to the invention.
Figure 23:
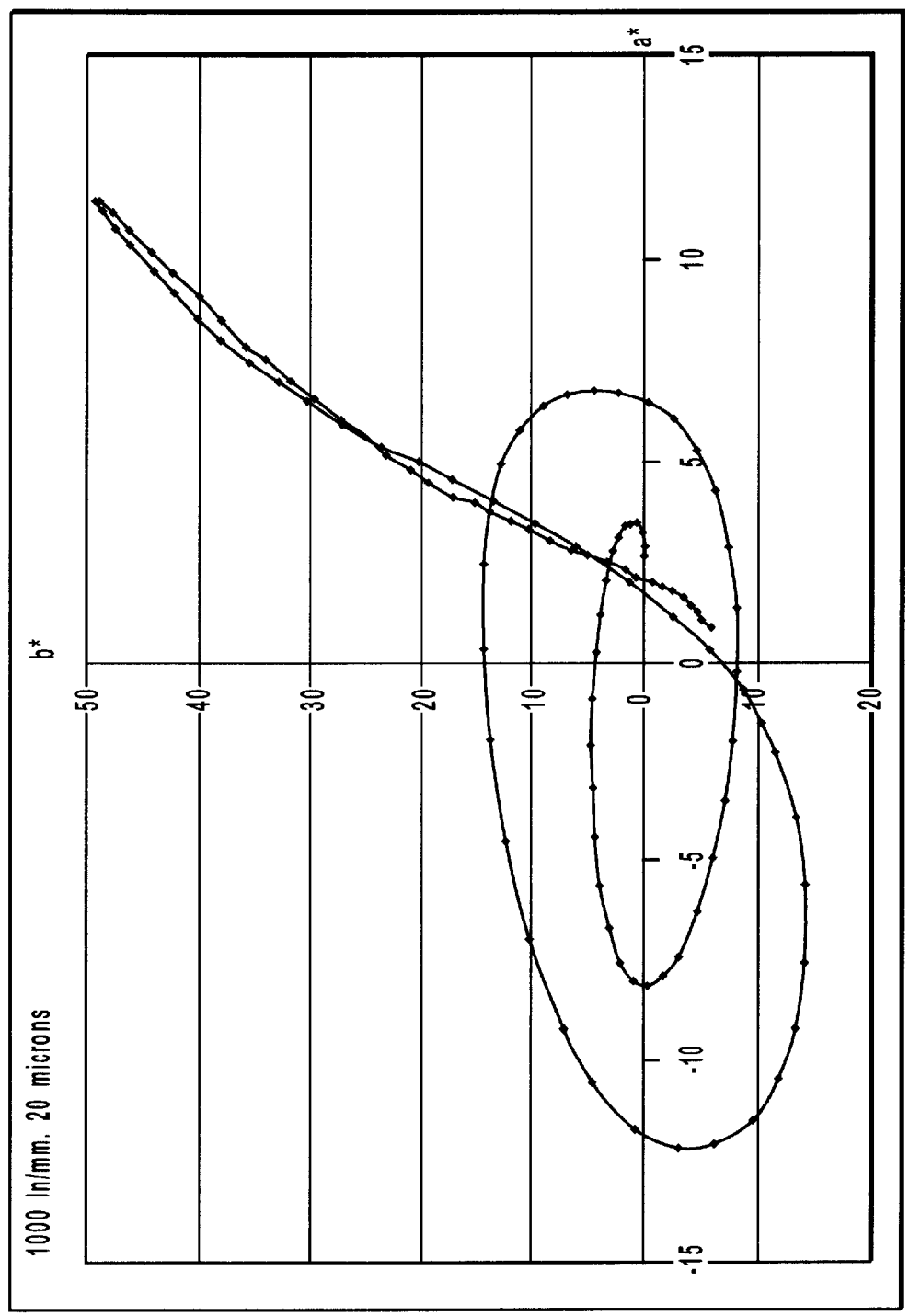

FIGS. 22 to 25 show the color variation in the a*b* color space for an ensemble of flakes in paint draw-downs having flake grating frequencies of 500, 1000, 1400 and 2000 ln/mm, respectively. Each diffraction order reflected from the ensemble of flakes contains all the wavelengths of the visible light separated by the angles β as formulated by Equation 1 set forth previously. When the Murakami Gonio-Photospectrometer scans a particular diffraction order it detects the entire visible spectrum. Thus, each scanned diffraction order will create a circle in the a*b* diagram. This is shown in FIG. 23 corresponding to the 1000 ln/mm grating frequency. The $2^{nd}$ order forms the circle closer to the origin (lower chroma) and the 1$^{st}$ order forms the circle further away from the orgin (higher chroma). The semi-straight line where a* and b* are changing monotonically corresponds to the zero order diffraction.

FIG. 22 shows the color travel of the 500 ln/mm paint draw-down. In this case, multiple orders were observed. The highest orders presented very little chroma that increased with the lowest orders. It should also be noted that for some angles where there was superposition of wavelengths from different orders, the trajectory of the curve was not a full circle. When superposition occurs, additive color mixing of light beams phenomena controls the color observed. As an example, if blue and yellow beams (complementary colors) are mixed, the resulting beam will look white to the observer. In addition, the chroma of the specular reflection was much higher that the chroma of the diffractive orders.

Figure 24:
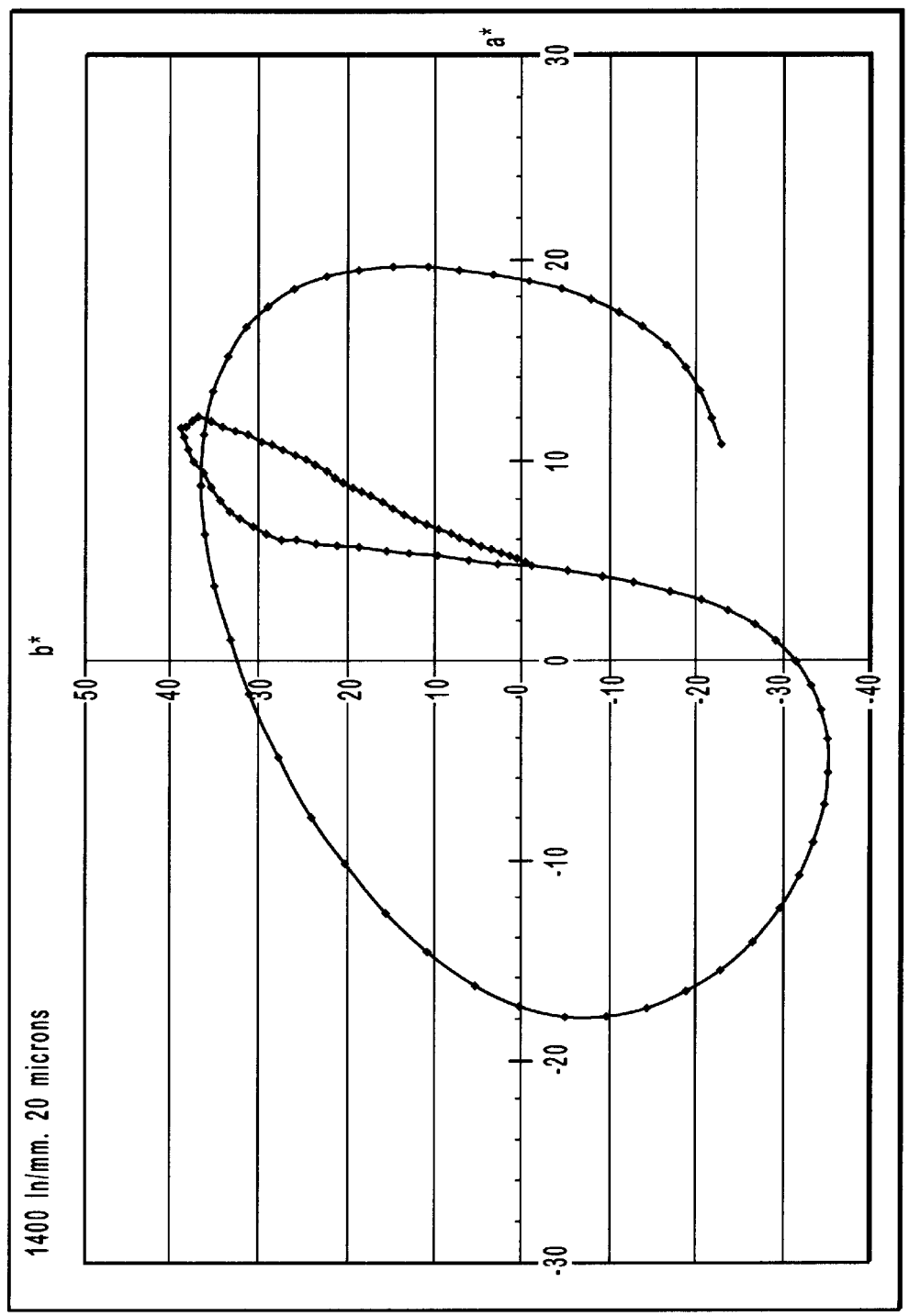
Figure 25:
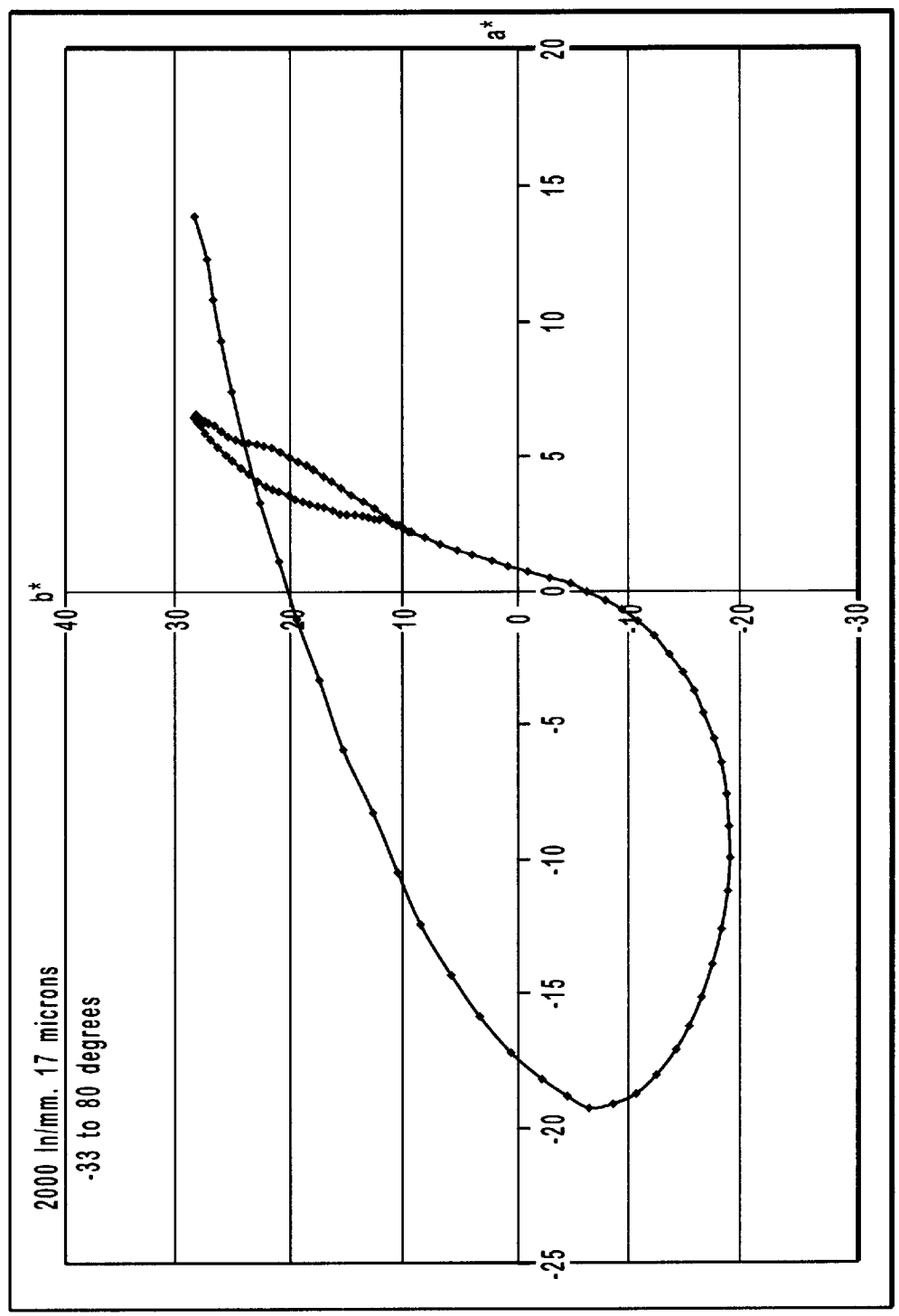

FIG. 24, corresponding to the 1400 ln/mm grating, shows only one circle. The chroma of each point of the trajectory is comparable with the specular reflection. For the 2000 ln/mm sample, FIG. 25 depicts that a half circle is formed, and again the chroma for each point is equivalent to the specular reflection. These results show that to get strong diffractive effects, it is necessary to eliminate the highest orders using appropriate grating frequencies and groove depths.

Example 12

Figure 26:
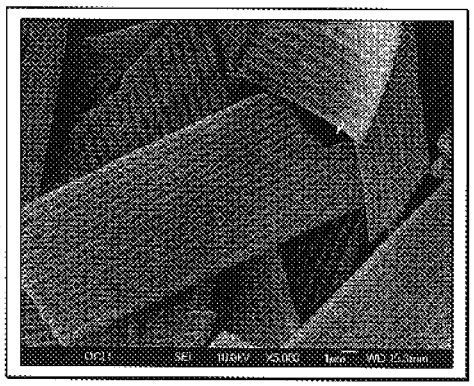
FIGS. 26–30 are photographs taken with a Scanning Electron Microscope of various diffractive pigment flakes made according to the invention.
Figure 27:
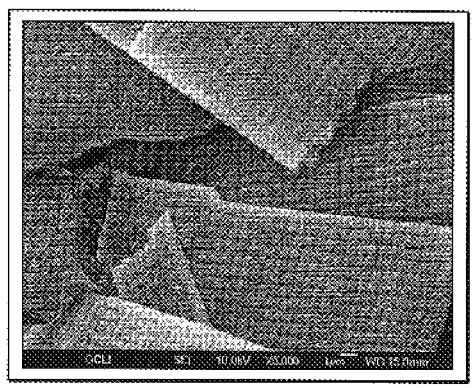
Figure 28:
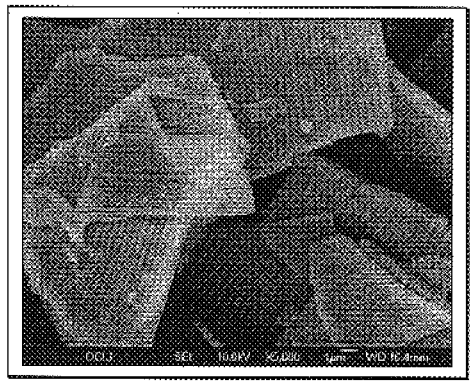
Figure 29:
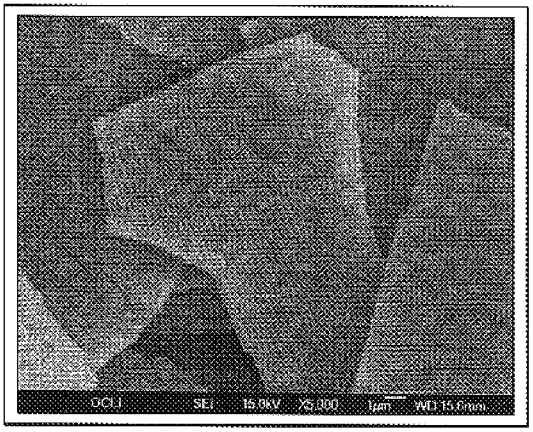
Figure 30:
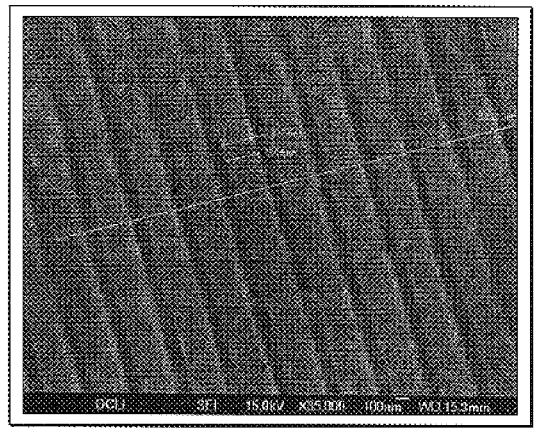

FIGS. 26–30 are photographs taken with a Scanning Electron Microscope of various ground diffractive flakes produced according to the present invention. Specifically, FIG. 26 shows flakes with a 1400 ln/mm linear grating, FIG. 27 shows flakes with a 1400 ln/mm cross grating, and FIG. 28 shows flakes with a 2000 ln/mm linear grating, which were all made as described hereinabove with respect to Example 11. FIGS. 29 and 30 are photographs of flakes with a 3000 ln/mm linear grating. FIGS. 29 and 30 verity that even for high grating frequencies, the grating pattern is transferable to a thin film stack to make grated flakes. The microstructure obtained in all cases was very homogeneous, indicating a good replication of the grating substrates.

Example 13

Figure 31:
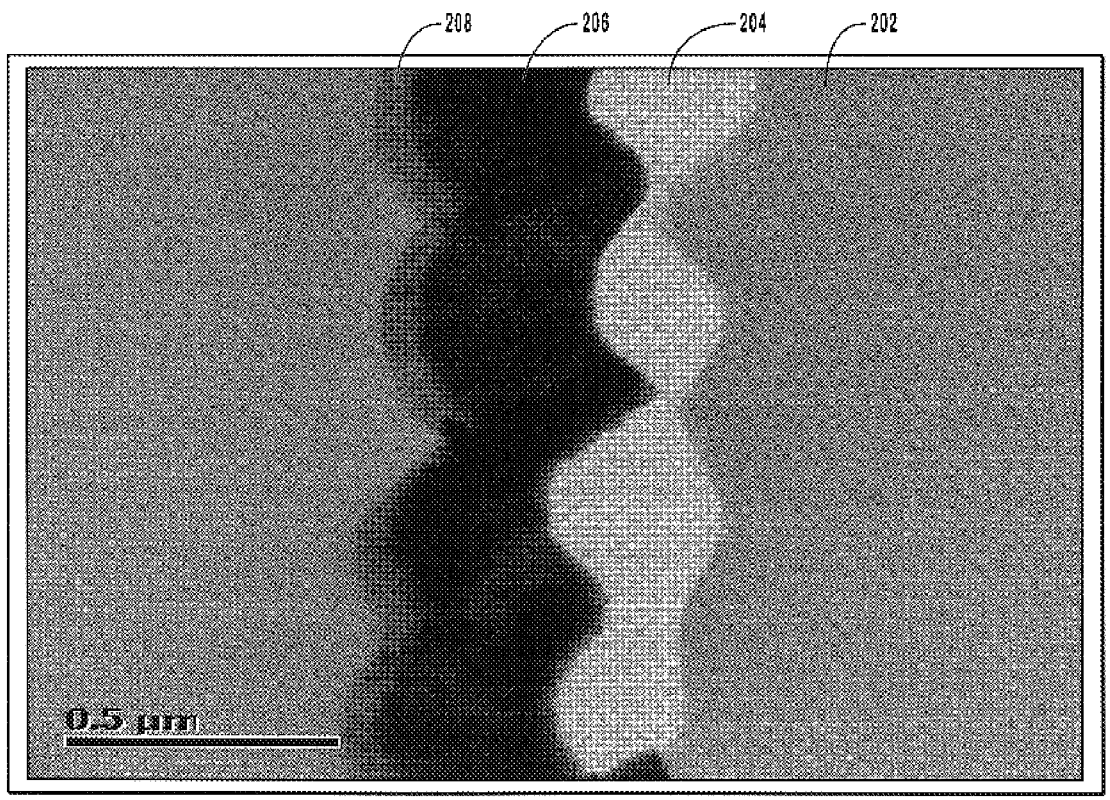
FIG. 31 is a cross-section transmission electron micrograph showing the coating microstructure of a diffractive pigment flake of the invention.

FIG. 31 is a cross-section transmission electron micrograph showing the coating microstructure of a diffractive pigment particle which has been delaminated from a grating substrate. In particular, the micrograph shows a 2000 ln/mm grating 202 used to form a multilayer coating structure including a dielectric layer 206 and a reflective layer 208. A delamination zone 204 is shown between grating 202 and dielectric layer 206. The dielectric layer 206 is a 7 QWOT layer of ZnS at 550 nm, and the reflective layer 208 is an 80 nm layer of Al. The physical thickness of the ZnS layer is about 410 mn, thus providing a thin film stack with a physical coating thickness of about 490 nm. The micrograh shows that the coating layers follow the profile of grating 202 and thus should maintain the diffractive optical effects of the uncoated grating.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A diffractive pigment flake, comprising:
   a layer of a first material having a reflective surface; and
   a diffractive structure formed on the reflective surface, the diffractive structure having a pitch and amplitude selected to decrease the intensity of a zero order diffracted light beam in order to increase the intensity and color contrast of at least one higher order diffracted light beam.

2. The pigment flake of claim 1, wherein the first material is selected from the group consisting of aluminum, silver, copper, gold, platinum, tin, titanium, palladium, nickel, cobalt, rhodium, niobium, chromium, and compounds, combinations or alloys thereof.

3. The pigment flake of claim 1, further comprising at least one layer of a second material having a substantially higher modulus of elasticity than the first material to increase the stiffness of the diffractive pigment flake.

4. The pigment flake of claim 3, wherein the second material comprises a substantially transparent dielectric material.

5. The pigment flake of claim 4, wherein a layer of substantially transparent dielectric material is disposed on opposing sides of the layer of a first material.

6. The pigment flake of claim 4, wherein the dielectric material has a refractive index of about 1.65 or less.

7. The pigment flake of claim 4, wherein the dielectric material has a refractive index of about 1.5 or less.

8. The pigment flake of claim 4, wherein the dielectric material is selected from the group consisting of magnesium fluoride, silicon dioxide, aluminum oxide, aluminum fluoride, cerium fluoride, lanthanum fluoride, neodymium fluoride, samarium fluoride, barium fluoride, calcium fluoride, lithium fluoride, and combinations thereof.

9. The pigment flake of claim 3, wherein the first material comprises aluminum and the second material comprises magnesium flouride.

10. The pigment flake of claim 1, wherein the pigment flake has a thickness of less than about 1.5 microns.

11. The pigment flake of claim 1, wherein the pigment flake has a width of less than about 50 microns.

12. The pigment flake of claim 1, wherein the pigment flake has a width of less than about 25 microns.

13. A diffractive pigment flake, comprising:
   a reflective layer having a first surface and an opposing second surface; and
   a diffractive structure on at least one of the first or second surfaces, the diffractive structure having pitch of at least about 1,400 lines per mm and an amplitude modulation provided by a change in surface depth of at least about 150 nm.

14. The pigment flake of claim 13, wherein the pitch of the diffractive structure is about 2,000 lines per mm or less and the change in surface depth is about 220 nm or less.

15. The pigment flake of claim 13, further comprising at least one layer of a dielectric material.

16. The pigment flake of claim 15, wherein the reflective layer comprises aluminum and the dielectric material comprises magnesium flouride.

17. A diffractive pigment flake, comprising:
   a reflective layer having a first surface and an opposing second surface;
   a diffractive structure on at least a portion of one or both of the first and second surfaces, the diffractive structure capable of producing an angular separation of first and second order diffracted light beams such that there is no angular superposition of wavelengths from about 400 nm to about 800 nm within the first and second order diffracted light beams.

18. The pigment flake of claim 17, further comprising at least one layer of a dielectric material.

19. The pigment flake of claim 18, wherein the reflective layer comprises aluminum and the dielectric material comprises magnesium flouride.

20. A diffractive pigment flake, comprising:
a reflective layer having a first surface and an opposing second surface; and
a diffractive structure on at least a portion of one or both of the first and second surfaces, the diffractive structure characterized at normal incidence by a ratio of zero order intensity to first order intensity of at least about 0.25 and an angular separation between zero order and first order diffracted light beams of at least about 30 degrees.

21. The pigment flake of claim 20, further comprising at least one layer of a dielectric material.

22. The pigment flake of claim 21, wherein the reflective layer comprises aluminum and the dielectric material comprises magnesium flouride.

23. A diffractive pigment flake, comprising:
a reflective layer having a first surface and an opposing second surface; and
a diffractive structure on at least a portion of one or both of the first and second surfaces, the diffractive structure producing an angular separation of zero order and first order reflection of at least about 30 degrees.

24. The pigment flake of claim 23, further comprising at least one layer of a dielectric material.

25. The pigment flake of claim 24, wherein the reflective layer comprises aluminum and the dielectric material comprises magnesium flouride.

26. A diffractive pigment flake, comprising:
a central reflector layer having a first major surface, an opposing second major surface, and at least one side surface;
a first dielectric layer overlying the first major surface of the reflector layer; and
a second dielectric layer overlying the second major surface of the reflector layer;
wherein the pigment flake has a diffraction grating pattern thereon with at least about 1,400 grating lines per mm and a grating depth of at least about 150 nm.

27. The pigment flake of claim 26, wherein the reflector layer comprises a reflective material selected from the group consisting of aluminum, silver, copper, gold, platinum, tin, titanium, palladium, nickel, cobalt, rhodium, niobium, chromium, and compounds, combinations or alloys thereof.

28. The pigment flake of claim 26, wherein the reflector layer has a physical thickness of about 40 nm to about 200 nm.

29. The pigment flake of claim 26, wherein the first and second dielectric layers comprise a dielectric material having a refractive index of about 1.65 or less.

30. The pigment flake of claim 29, wherein the dielectric material is selected from the group consisting of magnesium fluoride, silicon dioxide, aluminum oxide, aluminum fluoride, cerium fluoride, lanthanum fluoride, neodymium fluoride, samarium fluoride, barium fluoride, calcium fluoride, lithium fluoride, and combinations thereof.

31. The pigment flake of claim 26, wherein the first and second dielectric layers are on each of the first and second major surfaces but not on the at least one side surface of the reflector layer.

32. The pigment flake of claim 26, wherein the first and second dielectric layers each have a physical thickness of about 1 micron or less.

33. The pigment flake of claim 26, wherein the first and second dielectric layers comprise magnesium fluoride and the reflector layer comprises aluminum.

34. The pigment flake of claim 26, wherein the diffraction grating pattern has from about 1400 to about 3500 grating lines per mm, and a grating depth from about 150 nm to about 230 nm.

35. The pigment flake of claim 26, wherein the diffraction grating pattern has from about 1400 to about 2000 grating lines per mm, and a grating depth from about 160 nm to about 220 nm.

36. The pigment flake of claim 26, wherein the first and second dielectric layers form part of a contiguous dielectric layer substantially surrounding the reflector layer.

37. The pigment flake of claim 26, wherein the pigment flake has a physical thickness of about 500 nm to about 1400 nm.

* * * * *